United States Patent
Vicat-Blanc-Primet et al.

(10) Patent No.: US 9,760,587 B2
(45) Date of Patent: Sep. 12, 2017

(54) TOOL FOR MANAGING COMPUTER RESOURCES AND INFRASTRUCTURES AND NETWORKS

(75) Inventors: Pascale Vicat-Blanc-Primet, Lyons (FR); Sebastian Soudan, Lyons (FR); Guilherme Koslovski, Guoy (FR)

(73) Assignee: F5 Networks, Inc., Seattle, WA (US)

( * ) Notice: Subject to any disclaimer, the term of this patent is extended or adjusted under 35 U.S.C. 154(b) by 382 days.

(21) Appl. No.: 13/641,353

(22) PCT Filed: Apr. 14, 2011

(86) PCT No.: PCT/FR2011/050860
§ 371 (c)(1),
(2), (4) Date: Dec. 10, 2012

(87) PCT Pub. No.: WO2011/128596
PCT Pub. Date: Oct. 20, 2011

(65) Prior Publication Data
US 2013/0091180 A1    Apr. 11, 2013

(30) Foreign Application Priority Data
Apr. 16, 2010    (FR) ...................................... 10 01623

(51) Int. Cl.
*G06F 17/30*    (2006.01)
*H04L 12/24*    (2006.01)
*H04L 29/08*    (2006.01)

(52) U.S. Cl.
CPC .... *G06F 17/30312* (2013.01); *H04L 41/0816* (2013.01); *H04L 41/0893* (2013.01); *H04L 67/10* (2013.01); *H04L 67/30* (2013.01)

(58) Field of Classification Search
CPC ......................................................... G06F 7/60
(Continued)

(56) References Cited

U.S. PATENT DOCUMENTS 8,448,170 B2 *    5/2013    Wipfel et al. ..................... 718/1
8,543,916 B2 *    9/2013    Anderson et al. ............. 715/704
(Continued)

OTHER PUBLICATIONS

International Search Report for corresponding PCT/FR2011/050860 dated (Aug. 16, 2011) (3 pages).
(Continued)

*Primary Examiner* — Baoquoc N To
(74) *Attorney, Agent, or Firm* — LeClairRyan, a Professional Corporation

(57) ABSTRACT

A tool for assisting the operation of a network of interconnected physical equipment includes a physical infrastructure manager associated with a first data structure in which the equipment items are registered under a resource identifier in relation to a first sequence of dated values of global utilizable functional capacity, and a virtual infrastructure manager associated with a second data structure in which virtual units are registered under a unit identifier in relation to a second sequence of dated values of global utilizable functional capacity, and with a third data structure in which a virtual unit identifier is associated with a group of resource identifiers and hence with the corresponding sequences of dated capacity values. The virtual infrastructure manager dynamically reconfigures a virtual infrastructure object in accordance with the rights and capacities requested by a user.

18 Claims, 30 Drawing Sheets

(58) Field of Classification Search
USPC .................................................. 707/792, 796
See application file for complete search history.

(56) References Cited

U.S. PATENT DOCUMENTS

| | | |
|---|---|---|
| 8,695,075 B2 * | 4/2014 | Anderson et al. ................ 726/8 |
| 8,745,205 B2 * | 6/2014 | Anderson et al. ............ 709/224 |
| 2005/0044301 A1 * | 2/2005 | Vasilevsky et al. .............. 711/1 |
| 2005/0157644 A1 | 7/2005 | Johansson et al. |
| 2007/0028244 A1 * | 2/2007 | Landis et al. ................. 718/108 |
| 2007/0061441 A1 * | 3/2007 | Landis et al. ................. 709/224 |
| 2007/0067366 A1 * | 3/2007 | Landis ......................... 707/205 |
| 2007/0067435 A1 * | 3/2007 | Landis et al. ................. 709/224 |
| 2008/0052719 A1 * | 2/2008 | Briscoe et al. .............. 718/104 |
| 2008/0295096 A1 * | 11/2008 | Beaty et al. ...................... 718/1 |
| 2011/0125849 A1 * | 5/2011 | Boyd et al. .................. 709/204 |
| 2011/0125895 A1 * | 5/2011 | Anderson et al. ............ 709/224 |
| 2011/0126047 A1 * | 5/2011 | Anderson et al. ............. 714/15 |
| 2011/0126099 A1 * | 5/2011 | Anderson et al. ............ 715/704 |
| 2011/0126197 A1 * | 5/2011 | Larsen et al. ..................... 718/1 |
| 2011/0126207 A1 * | 5/2011 | Wipfel et al. ................ 718/104 |
| 2011/0173319 A1 * | 7/2011 | Ha et al. ....................... 709/224 |
| 2013/0254768 A1 * | 9/2013 | Wipfel et al. .................... 718/1 |
| 2013/0311824 A1 * | 11/2013 | Ji et al. .......................... 714/15 |

OTHER PUBLICATIONS

Oberle et al., "Network Virtualization: The Missing Piece," Intelligence in Next Generation Networks, 13th International Conference on IEEE (Oct. 26, 2009) (6 pages).

Soudan et al., "Flow Scheduling and Endpoint Rate Control in Grid Networks," Future Generations Computer Systems, vol. 25(8), Amsterdam:Elsevier Science Publishers, pp. 904-911 (2009).

* cited by examiner

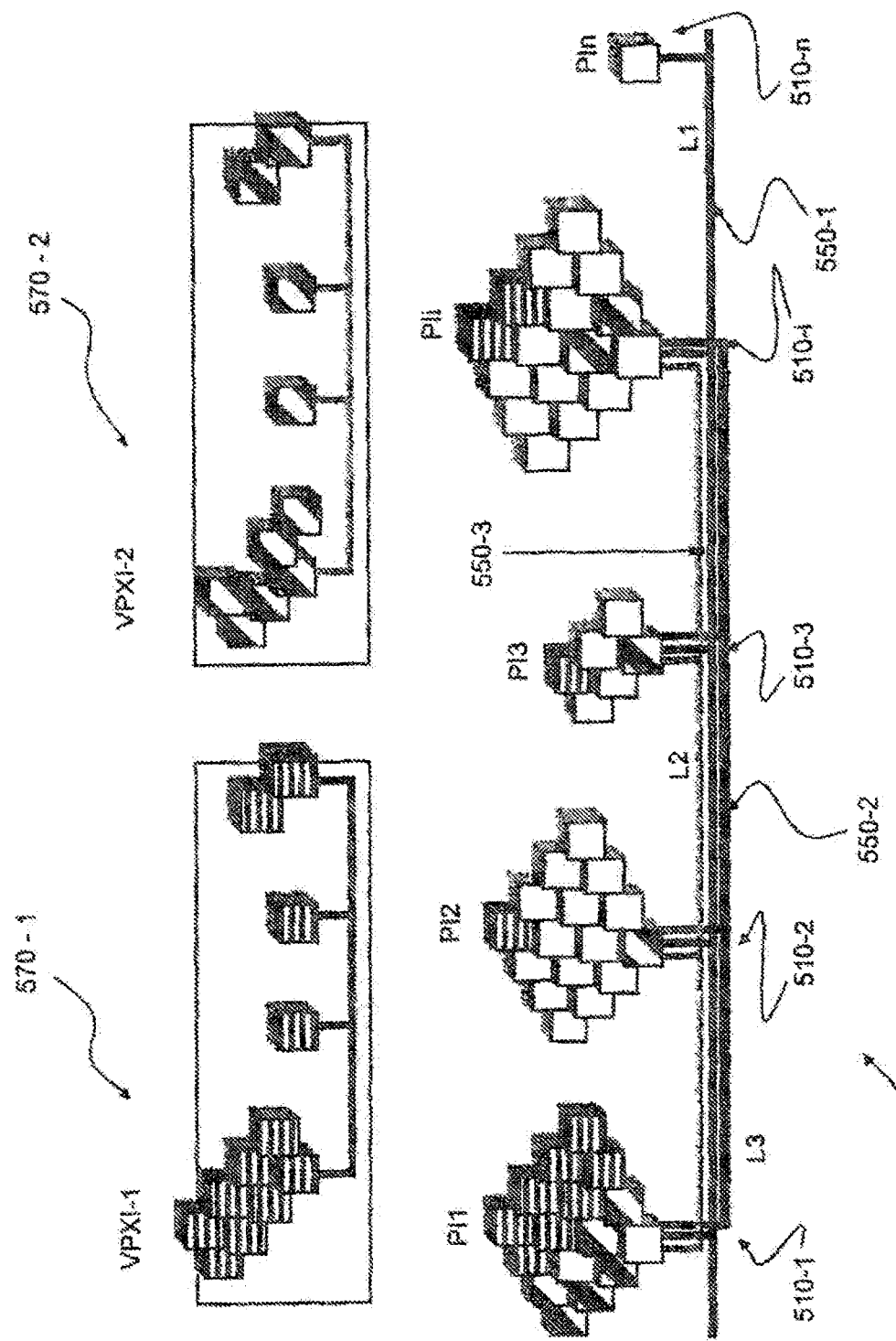

TOOL FOR MANAGING COMPUTER RESOURCES AND INFRASTRUCTURES AND NETWORKS

The present invention concerns computer networks and equipment for transmitting and/or processing digital data. The invention particularly concerns wide area networks operated by means of the "IP" protocol (Internet Protocol).

BACKGROUND

Computer networks and systems are designed and operated very differently from one to another.

Computer networks are usually shared simply i.e. without any particular contract or offer of guarantee particularly in respect of performance. Computing or storage systems and more generally the so-called "open" systems remain private and physically isolated at least regarding their own function.

To date there is no possibility of guaranteeing a performance or power level which could then be offered to a user for the use of a set of resources, a network or open system, optionally combined, for example via a rental contract.

Basically, wide area networks chiefly use the transmission of data in the form of formatted packets delivered following the Internet Protocol. The service offered by this Internet Protocol is of "best effort" type. The Internet Protocol provides for best effort delivery having regard to communication resources, in particular links and gateways, and to available computing resources in the network.

Some applications of wide area networks require guaranteed data delivery times and/or delivery rates. For video or music broadcasting for example the data is transmitted in the form of a signal sampled at a fixed frequency, and this signal must be reconstructed and restored to the receiver at this same frequency. Although these applications are able to accommodate variations in delivery time and/or rate to a certain extent, they nevertheless require a limited delivery time (of the same order of magnitude as the sampling period of the emitted signal) and a minimum delivery time so that the receiver is able to benefit from the quality and fluidity of the data such as broadcast (emitted).

In such cases, "best effort" transmission is not truly satisfactory.

It is possible, in a wide area network, to construct what is called a virtual private network. In this case, part of the transmission capacity can be dedicated to the virtual private network. The capacity thus immobilised for the virtual private network is generally greater than its actual needs; the intrinsic capacities of the private network link, in particular its bandwidth, may exceed needs and/or there are periods of time during which this virtual private link is not used. As a result, the total transmission capacity of the wide area network, including its time dimension, is ill-used.

At the present time, there is generalised use of Internet type networks. It is therefore desirable to make provision so that all types of data are able to transit on such networks, whether data accommodating the "best effort" approach, or on the contrary data which requires performance guarantees with respect to transmission rate and/or delivery time. The issue at stake is what is sometimes referred to as "the Internet of the Future".

SUMMARY OF THE INVENTION

It is an object of the present invention to provide a tool to assist in the operating of a network of interconnected equipment items each having transmission, storage and/or digital data processing capacities, comprising:

a physical infrastructure manager associated with a first storage of physical resource status data; this first data storage being arranged in a first data structure in which an identifier is matched with dated values of quantitative magnitudes; the physical infrastructure manager being adapted to register at least some of the network equipment as resource in the first data storage, with:

as resource identifier, an equipment identifier, and as dated values of quantitative magnitudes, a first sequence of dated values of processing, storage and/or transmission capacity of the equipment concerned defining a global, utilizable capacity of the resource;

a virtual infrastructure manager associated with a second storage of status data of a virtual infrastructure; the second data storage being arranged in a second data structure in which an identifier is related with dated values of quantitative magnitudes; the virtual infrastructure manager being adapted to register virtual units in the second data storage, with:

as identifier, an identifier of the unit, and as dated values of quantitative magnitudes a second sequence of dated values of processing, storage and/or transmission capacity of the virtual unit defining a global utilizable capacity of the unit;

the virtual infrastructure manager further being associated with a third data structure in which a virtual unit identifier is associated with a group of resource identifiers and hence with the corresponding sequences of dated capacity values; the first, second and third data structures thereby defining a virtual infrastructure object corresponding to a virtual unit identifier for at least some of these identifiers, whilst maintaining a correlation between the first and second sequences of dated values of processing, storage and/or transmission capacity;

a network manager in charge of holding rights and capacities for users as a function of time; the virtual infrastructure manager being arranged to reconfigure dynamically a virtual infrastructure object in relation to the requested rights and capacities; this reconfiguration comprising a reconfiguration of the content of the third data structure associated with the virtual infrastructure object and/or a reconfiguration of the content of the first data structure concerned by the virtual infrastructure object.

Optional additional or substitute characteristics of the invention are set out below.

Reconfiguration comprises reconfiguration of the content of the second data structure concerned by the virtual infrastructure object.

The first, second and third data structures jointly hold at least one object corresponding to a virtual infrastructure for which the network manager maintains access of public type.

The network manager keeps a so-called <<best effort>> capacity for at least one of the virtual infrastructures with public access.

The physical infrastructure manager registers at last some of the equipment of the network as resource in the first data storage with, as dated values of quantitative magnitudes, a third sequence of dated values of processing, storage and/or transmission capacity of the equipment concerned defining a so-called utilizable <<best effort>> capacity of the resource.

The first, second and third data structures hold a virtual unit object which is associated with each resource identifier held in the first storage in relation to a sequence of dated values of processing capacity defining capacity of <<best effort>> type.

The virtual infrastructure manager is adapted to register a virtual unit in the second data storage with, as dated values of quantitative magnitudes, a second sequence of dated values of processing, storage and/or transmission capacity of the virtual unit defining a global utilizable capacity of the unit resulting from aggregation of third sequences of dated values of processing, storage and/or transmission capacity defining a so-called utilizable <<best effort>> resource capacity.

The virtual infrastructure manager is arranged to reconfigure dynamically the <<best effort>> capacity object in relation to rights and capacities requested by users, in particular when the requested capacity exceeds the global utilizable capacity of a virtual unit.

The physical infrastructure manager is arranged to register a third sequence of dated values of processing, storage and/or transmission capacity, defining a reserved capacity of the resource, as dated values of quantitative magnitudes for each resource identifier associated with a virtual unit identifier, and in which each of these dated values is equal to or smaller than a corresponding dated value of the second sequence of values of the virtual unit under consideration.

The tool further comprises a fourth data storage arranged in a fourth data structure which relates an identifier with dated values of quantitative values, in which the virtual infrastructure manager is arranged to register a virtual resource identifier as identifier, and a sequence of dated values of processing, storage and/or transmission capacity of the virtual resource concerned defining a global utilizable capacity of the virtual resource, and also comprising a fifth data storage arranged in a fifth data structure in which a virtual resource identifier is associated with a resource identifier, and in which the virtual infrastructure manager holds a correlation between the sequence of dated values of the virtual resource and a sequence of dated values held in the first data structure in relation to the resource identifier under consideration.

The virtual infrastructure manager is arranged to hold the second sequence of dated values of processing, storage and/or transmission capacity of each of the virtual units as an aggregation of sequences of dated values registered in the first data structure in relation to at least some of the resource identifiers held in the third data structure relating to the identifier of the virtual unit under consideration.

The virtual infrastructure manager, for each of the virtual units, holds an instance of a virtual infrastructure object loaded in memory for every time period corresponding to a nonzero processing, storage and/or transmission capacity of this virtual unit.

The first or second data structure also holds a list of non-functional attributes related to the resource identifier or unit identifier, the said list comprising one or more elements of the group formed by attributes relating to security, performance, geographical location, financial cost, energy cost, ownership, reliability and/or performance monitoring.

The physical infrastructure manager, the virtual infrastructure manager and at least some of the equipment of the network are mutually synchronized.

The equipment of the network comprises at least some of the nodes of the said network and the network links linking these nodes together.

At least some of the links comprise communication links conforming to the Internet Protocol.

BRIEF DESCRIPTION OF THE DRAWINGS

Other characteristics and advantages of the invention will become apparent on examining the following detailed description and the appended drawings in which:

FIG. 5B illustrates part of the infrastructure in FIG. 5A in virtualized form;

DETAILED DESCRIPTION

In addition, the detailed description is furthered by the following annexes:

Annex 1 illustrates an example of data structures which can be used to implement the invention;

Annex 2 defines a set of functions to be used in the invention.

These Annexes form an integral part of the description and can therefore be used not only for better comprehension of the present invention, but also to contribute towards the definition thereof when necessary. This also applies in every aspect to the drawings.

The present document may contain elements which may come under copyright protection. The holder of the rights has no objection to the identical reproduction by any person of this patent document such as it is included in files and/or publications of patent offices. On the other hand, for the remainder, the holder reserves full and entire copyright.

Figure 1:
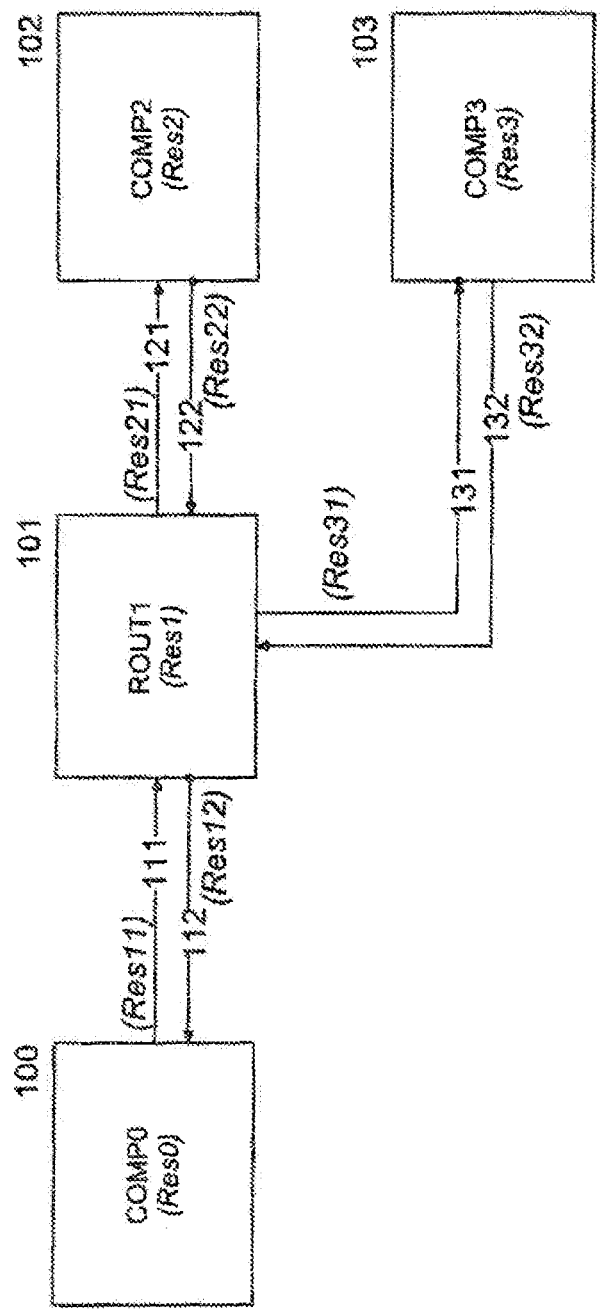
FIG. 1 physically illustrates a data handling infrastructure.

FIG. 1 shows three computers 100, 102 and 103, also called "COMP0", "COMP2" and "COMP3", interconnected via a router 101 also denoted "ROUT1". The computer COMP0 100 is interconnected with the router ROUT1 101 via a bi-directional link whose directions are broken down into an outbound link 111, from COMP0 to ROUT1, and an inbound link 112 from ROUT1 to COMP0. Similarly, the router ROUT1 101 is interconnected with computer COMP2 102 by an outbound link 121 from ROUT1 to COMP2, and an inbound link 122 from COMP2 to ROUT1. The router ROUT1 101 is also interconnected with the computer COMP3 103 via an outbound link 131 from ROUT1 to COMP3 and an inbound link 132 from COMP3 to ROUT1.

The word "arc" can be used for the word "link".

The outbound and/or inbound links may be Internet links at least in part.

Each of the elements which have just been described in connection with FIG. 1 is considered to be a resource. Therefore the following are resources:

computer COMP0 100, or resource "Res0";
router ROUT1 101, or resource "Res1";
computer COMP2 102, or resource "Res2";
computer COMP3 103, or resource "Res3";
the outbound link 111, or resource "Res11", allocated to the source point i.e. the computer COMP0 100;
the inbound link 112, allocated as resource "Res12" to the router ROUT1 101;
the outbound link 121, allocated as resource "Res21" to the router ROUT1 101;
the inbound link 122, allocated as resource "Res22" to the computer COMP2 102;
the outbound link 131, allocated as resource "Res31" to the router ROUT1 101;
the inbound link 132, allocated as resource "Res32" to the computer COMP3 103;

FIG. 1 is presented as a reduced system in which the invention starts to become apparent. Evidently a wide area network would comprise many more resources. However they will remain processed, at least in part, as is described with reference to FIG. 1.

In addition, the elements such as the computers or the router in FIG. 1 are often called "nodes" when considered as being interconnected in a network. Therefore within a network, a node may be a computer, a router, a switch, a storage system, a modem or a display system, a data acquisition system or a sub-network of sensors. These nodes are interconnected via network links, generally bi-directional as seen above.

Figure 2:
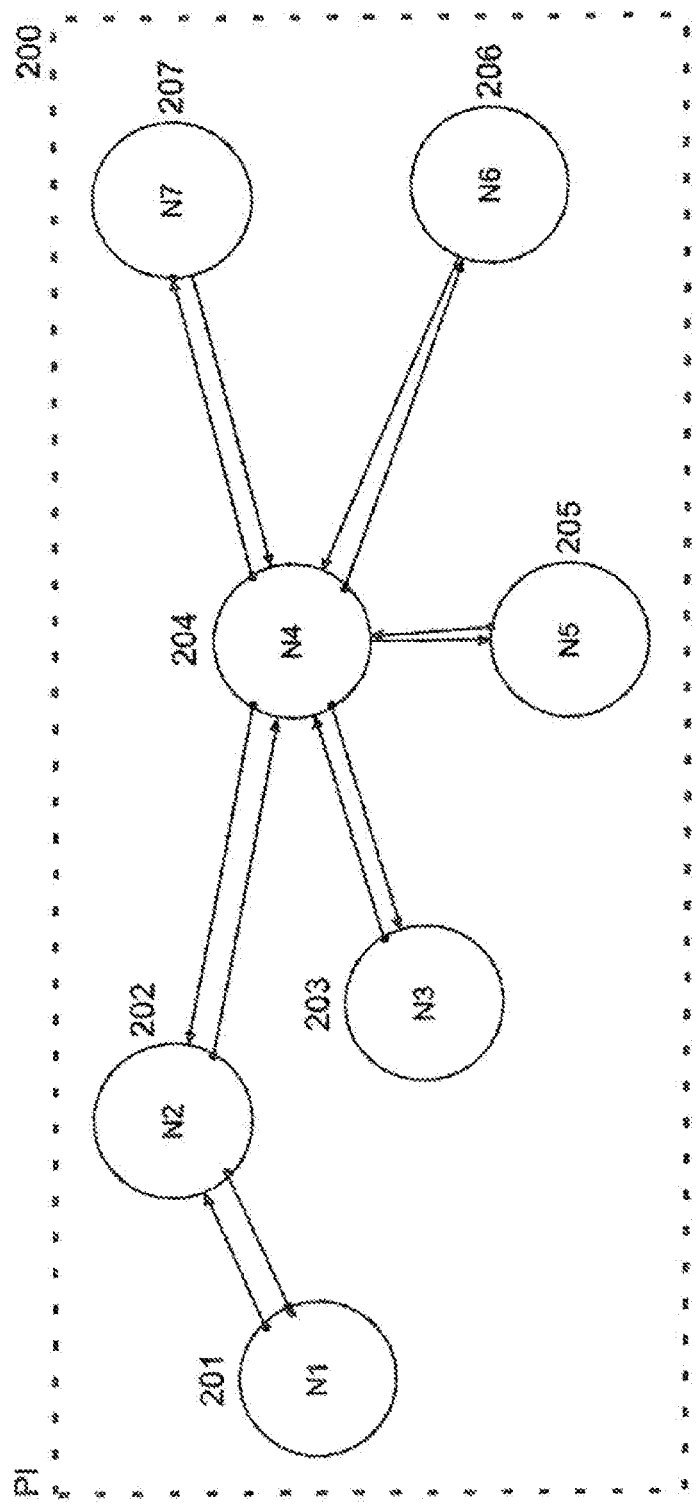
FIG. 2 physically illustrates another data handling infrastructure.

FIG. 2 schematically illustrates a simple example of what is currently called a "physical wide area infrastructure". This physical infrastructure, hereinafter called infrastructure PI200 has a node 201 designated N1, interconnected with a node 202 designated N2 via an outbound link 2012 designated L12 and an inbound link 2021 designated L21. The node N2 202 is itself interconnected with a node 204 designated N4 via an outbound link 2024 referenced L24 and an inbound ink 2042 referenced L42.

With the node N4 204 are also interconnected the nodes designated N3 203, N5 205, N6 206 and N7 207 respectively via outbound links L34 2034, L54 2054, L64 2064, L74 2074, and inbound links L43 2043, L45 2045, L46 2046, L47 2047.

All the nodes Ni and links Li linking them together form the infrastructure PI 200. This infrastructure PI 200 is delimited by a frame shown as a thick dashed line in FIG. 2. Here the nodes are mostly computers. However, in the example, the node N4 may be a computer, a router or a server.

It is assumed here that a node Ni corresponds to a physical unit of the infrastructure PI 200 (e.g. a computer or a router), the links chiefly being network links including Internet links when applicable.

The exact nature of a node and of its links depends on the fineness of the breakdown of the physical infrastructure: in a finer representation, a node could be formed of a functional unit of a computer (disk, processing unit) whilst in a less fine representation a node could consist of a sub-network for example. Also, the fineness of the breakdown may differ depending on the nodes of the infrastructure: one particular node may consist of a sub-network assembly whilst a different node of the same infrastructure could solely consist of an individual computer of another sub-network.

Figure 3:
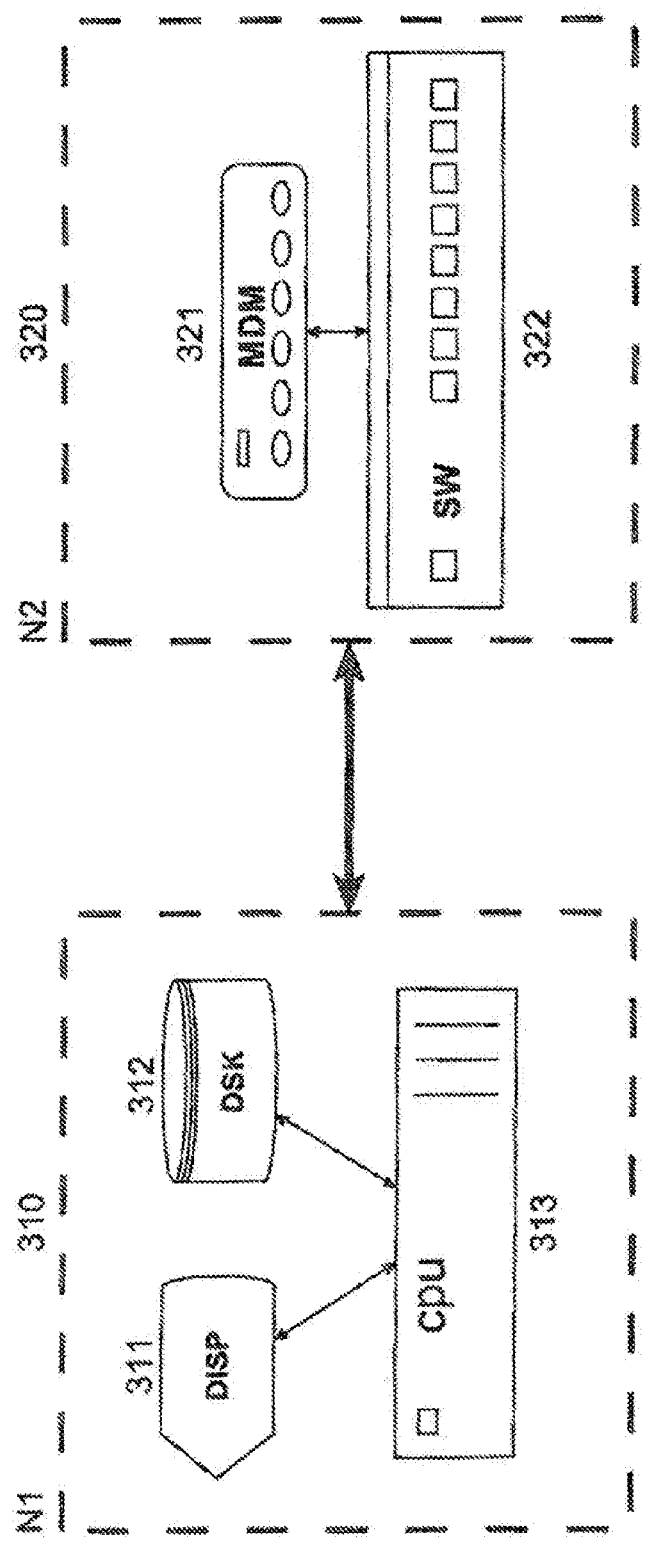
FIG. 3 illustrates two nodes of a data handling infrastructure.

FIG. 3 is a generic, simplified example of the variety of devices which may form a node. This FIG. 3 shows a node N1 310 interconnected with a node N2 320.

The node N1 310 may comprise a display device, or device DISP 311, and/or a storage disk or disk DSK 312 with its controller, and/or a central processing unit or CPU unit 313.

The node N2 320 may comprise a modem MDM 321 and/or a switch SW 322 which may also be a router.

The resources included in a node are at least partly configurable, for example by means of a command received by the computing unit or CPU of the node under consideration. The term computing unit is to be taken here in its broad sense and is not limited to the microprocessor equipping the central unit of a personal computer, of a work station or a server.

On the basis of such structures it is possible to obtain sophisticated wide area networks. In this field there is a current project called "HIPCAL" and another called "CARRIOCAS" which use the "HIPerNet" concept, namely easy, protected access to a distributed computing infrastructure. This type of network is often associated with the notion of grid networks, grid computing or cloud computing. The word "computing" herein refers to any operation which can be performed by a computer.

Some publications in this field will now be cited.

"Flow scheduling and import rate control in grid networks", S. SOUDAN, B. CHEN, P. VICAT-BLANC PRIMET, *Future generation computer systems* 25 (2009), Elsevier, pages 901 to 911.

This article looks at the management of movements of massive sets of data within distributed, computing or storage resources, associated with scientific data capture instruments. The proposed solution is based on a mechanism using a bandwidth profile associated with the conventional transport protocol. This article introduces the approach of malleable allocation of resources via a time capacity profile represented by a stepped function. This profile is only used if the IP bandwidth is allocated to deliver a volume of data in deterministic time.

"Virtualizing and scheduling optical network infrastructure for emerging IT services", P. VICAT-BLANC PRIMET, S. SOUDAN, D. VERCHERE, *Optical networks for the Future Internet*, special edition of the *Journal of Optical Communications and Networking* (JOCN), 1(2):A121-A132, 2009.

This article examines the management of bandwidth reservations in an optical network. The proposed solution is based on an optimization algorithm using linear programming and mixing of rigid requests and malleable requests (with several bandwidth levels).

"A scalable security model for enabling Dynamic Virtual Private Execution Infrastructures on the Internet", P. VICAT-BLANC PRIMET, J-P. GELAS, O. MORNARD, G. KOSLOVSKI, V. ROCA, L. GIRAUD, J. MONTAGNAT, T. TRUONG HUU, in IEEE/ACM *International Conference on Cluster Computing and the Grid* (CCGrid2009), Shanghai, May 2009.

This article examines the management of security in virtual infrastructures on request. The proposed solution is based on the use of an infrastructure with simplified public key and on delegation.

This article introduces the concept of a virtual infrastructure combining network and computer processing resources. No time management is included.

"Les Infrastructures Virtuelles à la demande pour un usage flexible de l'Internet". F. ANHALT, G. KOSLOVSKI, M. PASIN, J-P. GELAS, P. VICAT-BLANC PRIMET, *Journées Doctorales en Informatique et Réseaux, JDIR* 09, Belfort, France, February 2009.

This article introduces the concept of a virtual infrastructure combining network and computer processing resources. No time management is developed therein.

"Exploring the virtual infrastructure service concept in Grid5000", P. VICAT-BLANC PRIMET, F. ANHALT, G. KOSLOVSKI, 20$^{th}$ *ITC Specialist Seminar on Network Virtualization*, Hoi An, Vietnam, May 2009.

This article explores the concept of virtual infrastructures combining network and computer processing resources. It focuses on the use of a said infrastructure for creating experimental environments on request.

"VXDL: Virtual Resources and Interconnection Networks Description Language", G. PIEGAS KOSLOVSKI, P. VICAT-BLANC PRIMET, A. SCHWERTNER CHARAO, *Network for Grid Applications*, Springer Berlin Heidelberg, 2009.

This article proposes a description language of a "virtual infrastructure" entity combining network resources and computing resources.

"Network Virtualization: State of the Art and Research Challenges", N. M. MOSHARAF KABIR CHOWDHURY, R. BOUTABA, *IEEE Communications Magazine*, July 2009, pages 20 to 26.

This article takes stock of state of the art issues relating to network virtualization. It does not mention any combination of virtualized network resources and computing resources.

"Executing distributed applications on virtualized infrastructures specified with the VXDL language and managed by the HIPerNET framework", G. KOSLOVSKI, T. TRUONG HUU, J. MONTAGNAT, P. VICAT-BLANC PRIMET, *First International Conference on Cloud Computing (CLOUDCOMP* 2009), Munich, Germany, October 2009.

This article examines the use and evaluation of virtual infrastructures combining network resources and computing resources. Time management is not developed.

"CARRIOCAS project: Towards Converged Internet Infrastructures Supporting High Performance Distributed Applications", O. AUDOUIN, D. BARTH, M. GAGNAIRE, C. MOUTON, P. VICAT-BLANC PRIMET, D. RODRIGUES, L. THUAL, D. VERCHERE, IEEE/OSA *Journal of Lightwave Technology*, 2009.

This article very generally presents the approach to combined virtualization of network and computing equipment.

The content of these articles is considered as a whole as being integrated herein.

American patent application to JOHANSSON et at published under number US 2005/0157644 A1 titled "Method and system for reserving resources within an IP-Network".

In wide area networks such as those in the above articles, in particular HIPCAL and the associated HIPerNET concept, "virtualization" is most often used i.e. an assembly of physical elements of a physical infrastructure are collectively managed to form a virtual element of a virtual infrastructure. For example, several computing units including units remote from each other can be virtually associated to form a single computing unit of greater capacity.

Conversely, one same element of the physical infrastructure may host different elements of one same virtual infrastructure or elements of different virtual infrastructures. This is the case for example when several virtual machines are run on one same physical machine.

Figure 4:
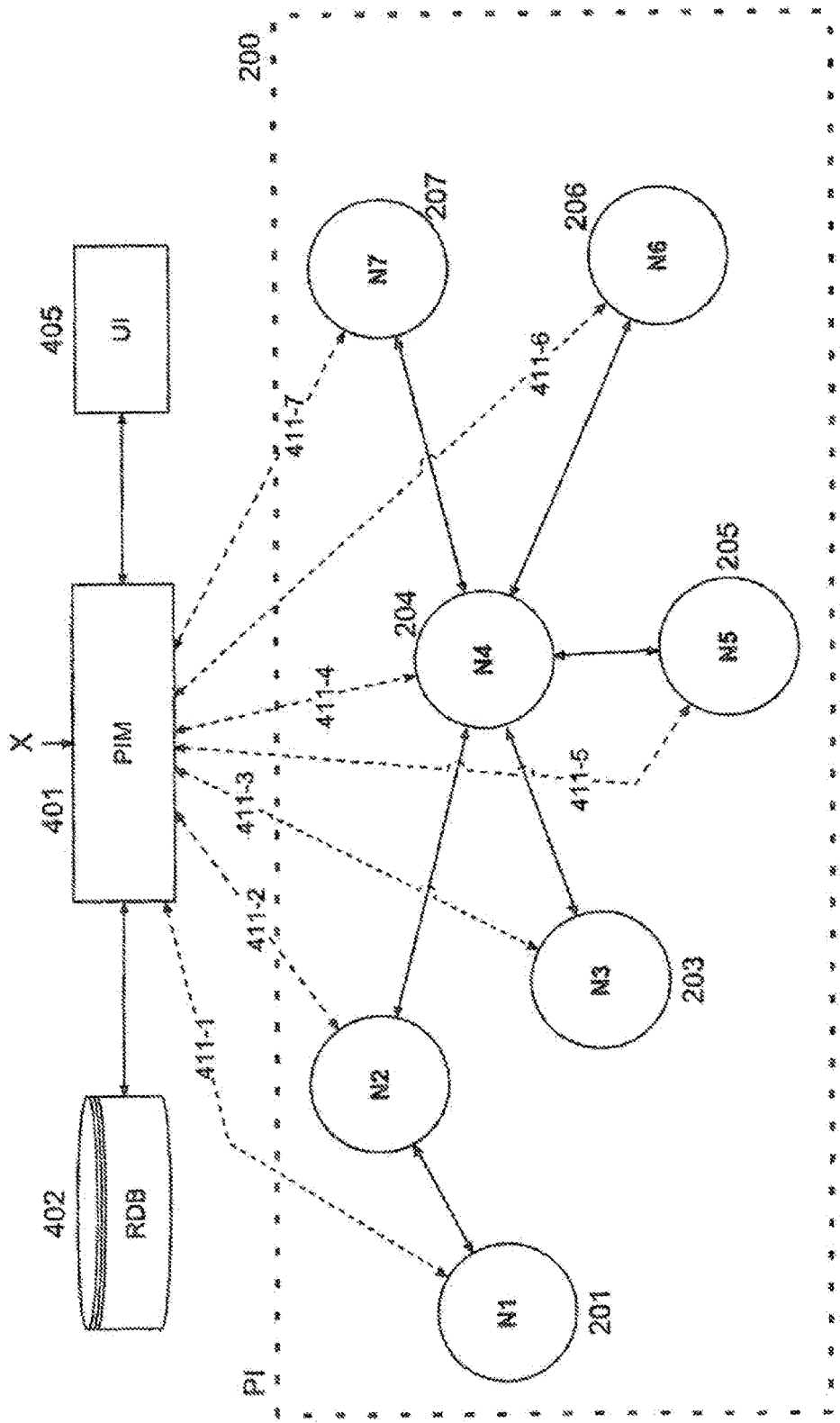
FIG. 4 illustrates the infrastructure in FIG. 2, modified according to one aspect of the invention.

FIG. 4 shows a physical infrastructure manager, or PIM manager 401, attached to the infrastructure PI 200. The PIM manager 401 is linked to each of the nodes Ni of this infrastructure PI 200 by means of a respective link 411-*i* illustrated as a thin dashed line. Each link allows data exchange between the PIM manager 401 and the corresponding node Ni.

The PIM manager 401 may also be linked to a user interface, or interface UI 405. This PIM manager 401 is capable of receiving a request X, optionally via the interface UI 405, this request being examined below.

The PIM manager 401 is adapted to keep a dynamic representation of the infrastructure PI 200, i.e. chiefly all the resources of this infrastructure PI 200 including the nodes Ni of this infrastructure and the communication links between these nodes. The PIM manager 401 is also adapted to keep a representation of the functional status of these resources.

In relation to each of the resources of the infrastructure PI 200, the PIM manager 401 particularly holds a list of so-called "physical" attributes, and a list of control and command functions for the resource under consideration. These control functions have the generic designation "CTRL( ) functions" and the command functions "CMD( ) functions". The form of the functions CTRL( ) and CMD( ) depends on the type of resource concerned.

For example, the PIM manager 401, for each of the resources of the infrastructure PI 200, keeps a corresponding object of type "data handling resource" such as defined in Annex A.1.1.2, designated hereafter as object of type R. It will be understood that a "type" of object may correspond to what is generally called a "class" of object.

Each object of type R notably comprises, as physical attributes, a physical universal resource identifier "URI" and a type of physical resource "type_r", this type belonging to the open ended group of types of resources described in Annex A.1.3.1.

The PIM manager 401 can be connected to a data storage space organized to keep this representation of the infrastructure PI 200. The storage space can assume the form here, at least in part, of a database designated base RDB 402 in FIG. 4.

In one advantageous embodiment, the PIM manager 401 creates an instance of class R for each resource of the infrastructure PI 200 in the form of what is a called a "daemon". Each daemon can therefore be invoked for example by functions listed in class R or by other functions.

Figure 28:
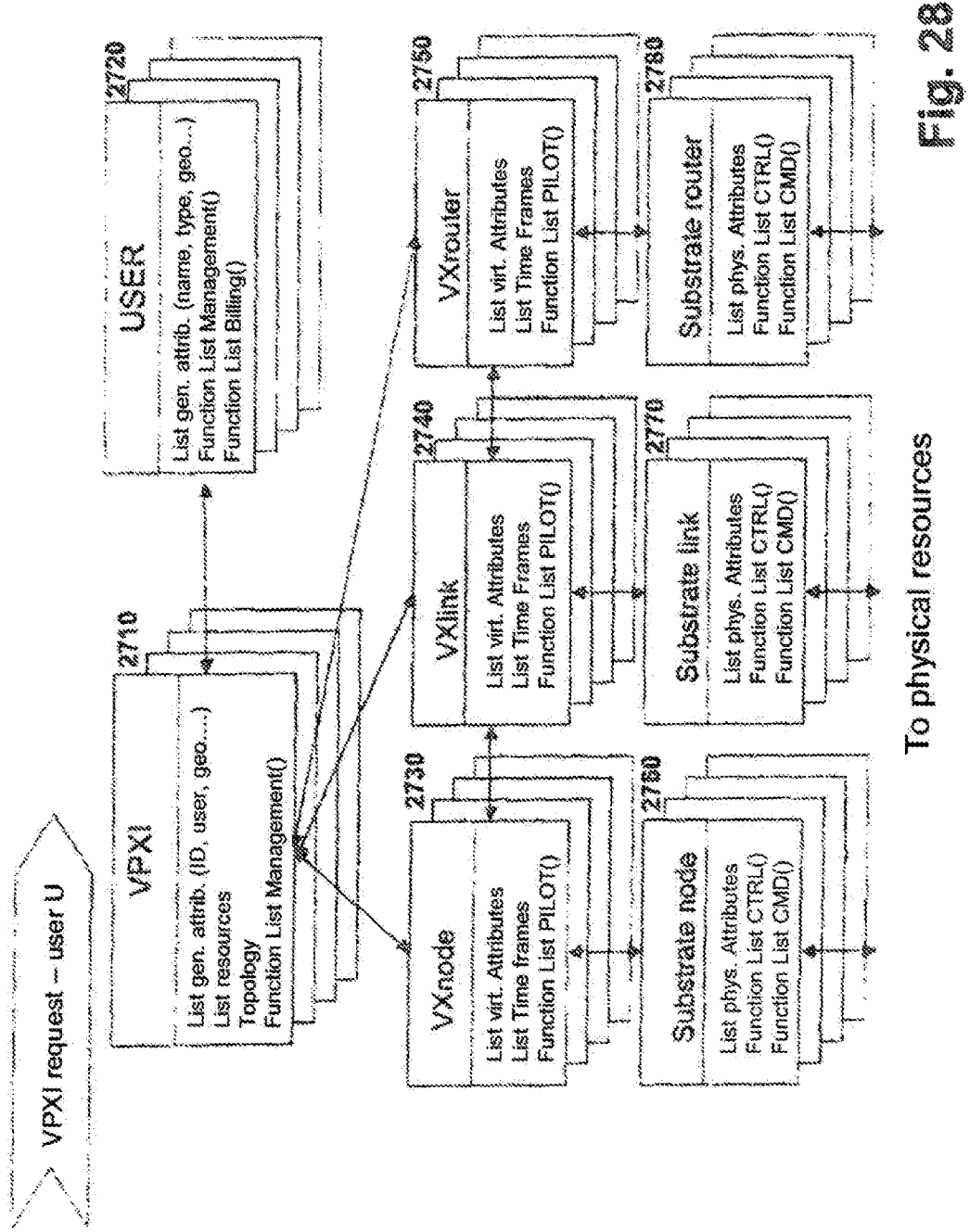
FIG. 28 is a schematic of a conceptual model of data for the tool of the invention.

For example FIG. 28 shows that the PIM manager 401 keeps:

for each node Ni of the infrastructure PI 200, a corresponding object generically denoted Substrate Node 2760;

for each link Li of network type between these nodes, a corresponding object generically denoted Substrate Link 2770;

for each router device, a corresponding object generically denoted Substrate Router 2780.

Although FIG. 4 shows two separate data exchange networks, it is possible to obtain a functionally equivalent device in a single network. In other words, the PIM manager 401 is able to exchange data with at least some of the nodes Ni via network links between these nodes.

In addition, although the PIM manager 401 is illustrated here outside the infrastructure PI 200, it is to be understood that this manager may also belong to this infrastructure, or even be distributed on one or more nodes thereof.

Figure 5A:
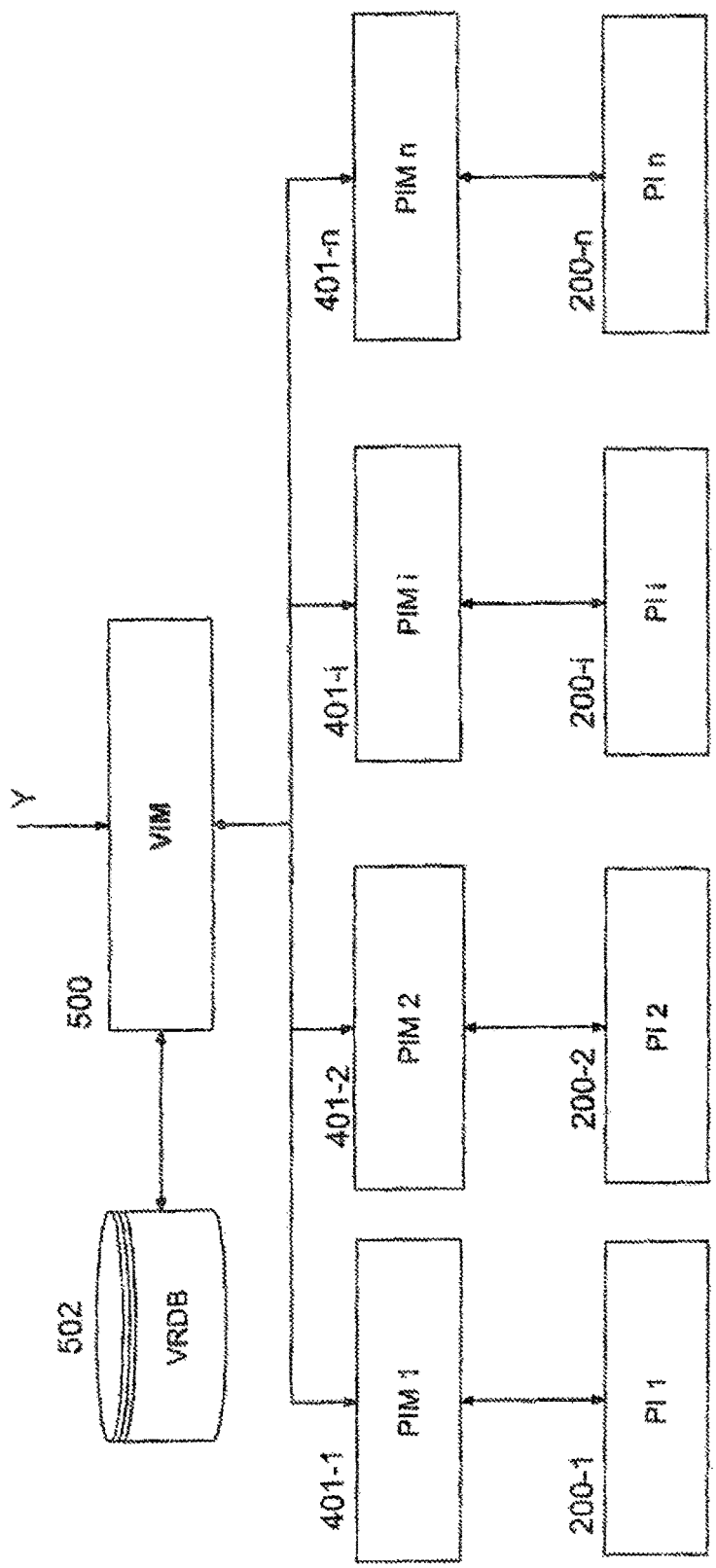
FIG. 5A physically illustrates a set of data handling infrastructures, completed in accordance with another aspect of the invention.

FIG. 5A shows a plurality of physical infrastructures, namely the infrastructures PI1 200-1, PI2 200-2 . . . PIi200-*i* . . . PIn 200-*n*, controlled by respective physical infrastructure managers, namely the managers PIM1 401-1, PIM2 401-2 . . . PIMi 401-*i* . . . and PIMn 401-*n*. These managers PIMi 400-*i* are linked to a virtual infrastructure manager or VIM manager 500. The communication between the VIM manager 500 and the managers PIMi-40I-i can take place as per a standard protocol for example of MTOSI type (Multi-Technology Operations System Interface) or a similar protocol, including proprietary.

The VIM manager 500 is capable of emitting requests X to each of the PIMi 401-*i*, these requests possibly comprising commands to be executed as will be seen below. This VIM manager 500 may receive requests Y which will also be examined below.

FIG. 5B, in its lower part, shows part of the infrastructure in FIG. 5A in so-called "virtualized" form that can be designated a virtual infrastructure or infrastructure VI 510.

In this virtualized form, each physical resource is seen by the VIM manager 500 to be a functional element in terms of data handling. The VIM manager 500 therefore views each physical infrastructure PI as an aggregate of functional elements.

FIG. 5B shows an example of a physical infrastructure PI1, referenced 510-1, a physical infrastructure PI2 referenced 510-2, a physical infrastructure PI3 referenced 510-3, a physical infrastructure P11, generic, referenced 510-*i* and a physical infrastructure PIn, referenced 510-*n*, each time in virtualized form.

Each functional element is represented by a cube. Although not visible in FIG. 5B, each physical resource can be fractionated regarding its own functional capacity into several functional elements. In addition, the capacity of these functional elements may be variable over time.

In generic manner, each functional element can be viewed as a "virtual machine" running on a physical resource.

The form of a virtual machine, and the management possibilities it offers, depend on the type of physical resource on which it is run and on its function within the infrastructure. On this point, the notion of virtual machine such as meant herein may go beyond what is conventionally technically meant by a virtual machine. For example, a partition of a data storage space can be considered as a virtual machine "being executed" on this space. This is done to assist in understanding the present description.

Examples of products allowing the virtualization of computing equipment comprise "VMWARE" software (registered trade name) and "XEN" software (registered trade name). An example of virtualizable switch/router was described in French patent application published under number:

Strictly speaking, the virtualization of a physical resource consists of defining one or more virtual resources which, in capacity and/or in time, share the functional capacity of this physical resource. This involves the execution of virtualization agents on the physical resource itself or at least on the PIM manager in charge of this resource. These agents may command, configure and/or control the physical resource via the CMD( ) and CRTL( ) functions mentioned above.

In practice, each manager PIMi 401-*i* decides which resources of its physical infrastructure are to be virtualized. For some resources, it can be chosen only to virtualize part of the resources.

The physical links forming the physical infrastructure can also be broken down into virtual links. For example, FIG. 5B shows a virtual link LI 550-1 linking the infrastructures PI2, PI3, PIi and PIn, whilst the virtual links L2-550-2 and L3 550-3 link the infrastructures PI1, PI2, PI3 and PIi.

In the "virtualized" form of the physical infrastructure, each node or link is seen as functionally homogeneous. In other words, for the virtual infrastructure, each resource at a given time only has one single function, called main function, such as storage, computing, communication link or router for example. Most often, a physical resource constantly ensures the same function, but this is not compulsory. For example, a personal computer, in that it has computing capability by means of its processor and storage capability offered by its hard disk, is able within a virtual infrastructure to offer these two functions, but not simultaneously.

Although the lower part of FIG. 5B only shows part of the infrastructure in FIG. 5A, it is to be understood that all this infrastructure can be virtualized, in particular each physical infrastructure PI-I, for example the infrastructure PI 1200-1, PI 200-2, PI-i 200-*i* and PIn 200-*n*.

In some cases, it is possible that all the nodes of one same physical sub-infrastructure permanently offer one same function. This is the case for example when the sub-infrastructure assumes the form of what is termed a "cluster". However this is not compulsory.

On the basis of a virtualized physical infrastructure such as shown in the lower part of FIG. 5B, the VIM manager 500 is adapted to define one or more virtual infrastructures or VPXI infrastructures ("Virtual Private eXecution Infrastructure"). Each VPXI infrastructure therefore comprises virtual nodes linked together via virtual links. In other words, a VPXI infrastructure is composed of virtual resources defined from physical resources. In general, each virtual node comprises part of the functional capacity of a physical node. And a virtual link comprises part of the bandwidth offered by the physical link or links on which it is based. However, some virtual resources may correspond to the entire functional capacity of a physical resource, at least all the functional capacity that it has been decided to virtualize, also called the "exposed capacity".

As an example, the upper part of FIG. 5B shows a first virtual infrastructure VPXI-1 570-1 comprising virtual nodes represented by cubes with horizontal hatching, and a second virtual infrastructure VPXI-2 570-2 comprising virtual nodes represented by cubes with oblique hatching. The hatching differentiating between the first and second virtual infrastructures VPXI-1 570-1 and VPXI-2 570-2 are reproduced in the lower part of FIG. 5B each time in relation to the corresponding physical nodes.

As mentioned above, a virtual node can be defined from only part of the functional capacity of one same physical node.

One same virtual sub-infrastructure may only group together resources having the same function (computing, storage or printing for example) which in a certain manner allows the adding of their respective capacities. However, it is also possible to create complex virtual infrastructures, for example comprising two computing elements linked together by an Internet link, in addition to a set of storage elements linked to one of these two computing elements.

The different virtual infrastructures are isolated from each other, which enables each infrastructure to benefit from a high level of security, capacity management and performance.

Once defined, a VPXI infrastructure can be specifically allocated to a user.

Inter alia the VIM manager 500 selects, allocates and manages the virtual resources and the links between virtual nodes.

Figure 27:
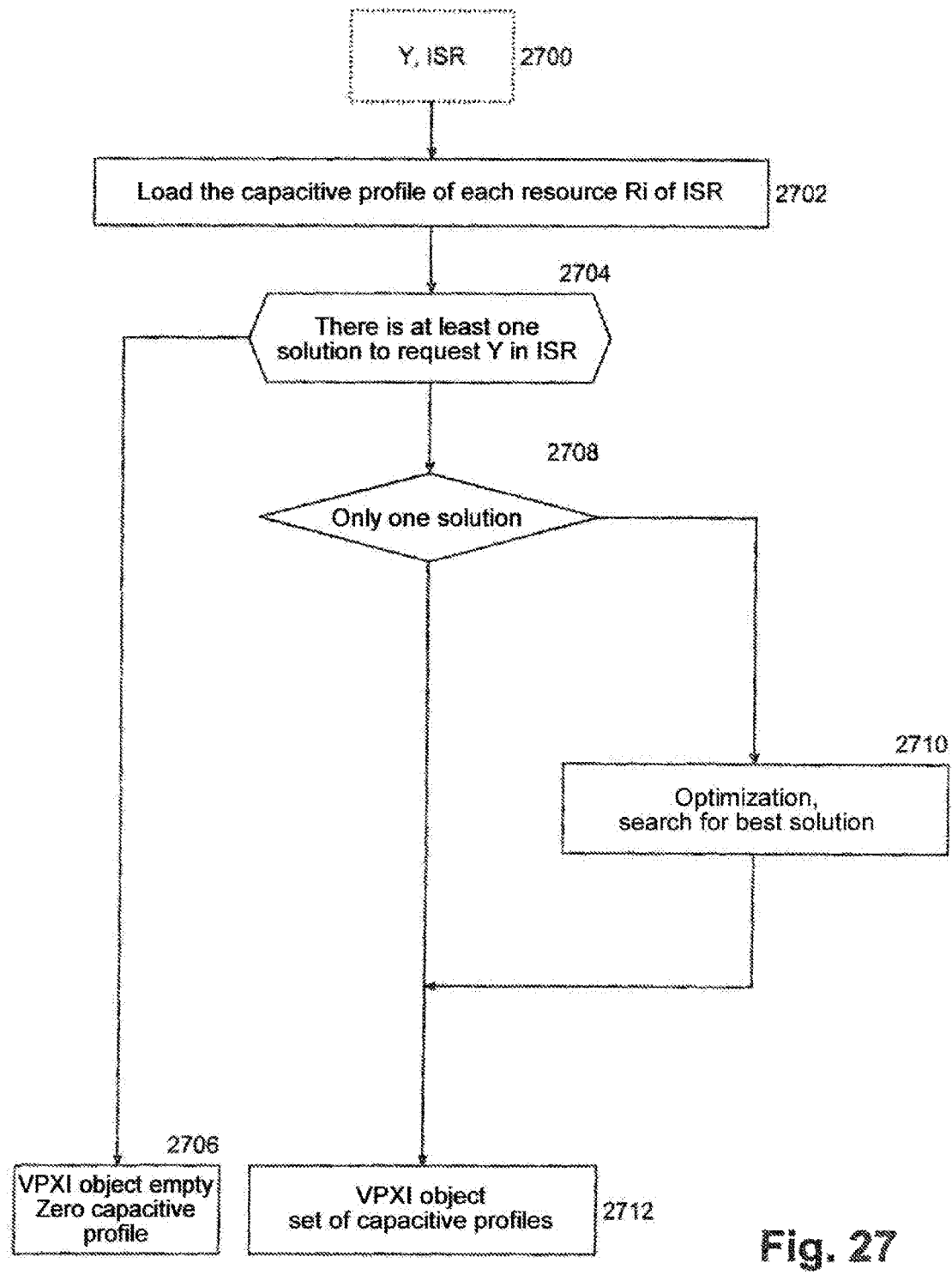

For each virtual VPXI infrastructure, the VIM manager 500 holds a computing object representing this infrastructure having the generic designation VPXI object 2710 in FIG. 27.

This VPXI object keeps a relationship between:

a set of general attributes relating to the virtual sub-infrastructure, comprising in particular identification data on the virtual sub-infrastructure, identification data of the user to whom this sub-infrastructure is allocated, geographical location data or "anchor point" designating the part of the PIM infrastructure 200 which requests the reserving of resources, security constraint data which defines the level of security required for the resources, allocation period data which defines a period of existence of the sub-infrastructure over time for example in the form of a reservation start date and a total execution time or date of end of allocation;

a list of resources, generally virtual, concerned by the VPXI object, in particular with the links linking the nodes together, the description of each resource, the functional and non-functional attributes of the resource namely the individual or aggregate resources involved in the sub-infrastructure, the performance levels of the resource under consideration e.g. its capacity, the security attributes of the resource, the type of access control or required level of confidentiality, optionally data on admissible reservation cost, the elementary functions which can be attributed to this resource, optionally the specific services provided by the resource;

the topology of the virtual network comprising performance characteristics such as bandwidth and latency, and attributes relating to security, commercial cost and time linking the virtual resources together;

a set of management functions which can be implemented on the sub-infrastructure;

a virtual time line with a summary definition of final resources and links.

For each virtual node, the VIM manager 500 creates and keeps a corresponding computing object, having the generic designation VXnode object 2730 in FIG. 28; relating a list of so-called "virtual" attributes with a list of piloting functions of the corresponding physical resource. These piloting functions have the generic designation PILOT( ). A VXnode object 2730 also comprises a list of time frames which are examined below.

Virtual attributes inter alia comprise a type of resource denoted "type_r", this type belonging to the open-ended set of "types of data processing resources" described in Annex A.1.3.1 or Rt set, having attributes of security, reliability, mobility, re-sizing and monitoring autonomy.

The VIM manager 500 also keeps a virtual link object for each virtual link of a virtual sub-infrastructure, having the generic designation VXlink 2740 object in FIG. 28, and which relates together entries similar to a VXnode object 2730. Inter alia a VXlink object 2740 comprises an identifier of the origin virtual node and an identifier of the destination virtual node.

The VIM manager, for each virtual router, also keeps a computing object having the generic designation VXrouter 2750 object in FIG. 28 and which has entries similar to the VXnode object.

As shown in FIG. 28, each VPXI object comprises pointers towards each of its constituent virtual resources, namely one or more VXnode 2730, VXlink 2740 and VXrouter 2750 objects.

Each VXnode object 2730 comprises a pointer towards a Substrate Node object 2760 corresponding to the physical node on which the virtual node is defined. In general, several VXnode objects 2730 may point towards one same Substrate Node object 2760.

Similarly, each VXlink object 2740 and each VXrouter object 2750 respectively points to a Substrate Link object 2770 and a Substrate Router object 2780.

The VIM manager 500, for each user of a VPXI infrastructure, also keeps a user object generically denoted USER object 2720 in FIG. 28, in relation to a VPXI object 2710 allocated to it. A USER object 2720 keeps a relationship between:

a list of general attributes related to the user, notably comprising user name data, user type data, geographical location data of the user;

a list of management functions, or generically designated Management( ) functions;

a list of payment functions, or generically designated Billing( ) functions.

For the storage of the different objects, the VIM manager 500 can be linked to an organized storage space of database type, for example the database VRDB 502 in FIG. 5A.

In one advantageous embodiment, each VXNode object 2730, each VPXI object 2710, each VXLink object 2740, each VXRouter object 2750 assumes the form of a "daemon" or of an agent executed by the VIM manager 500. As an option, each USER object 2720 may also assume this form.

This VIM manager 500 may advantageously be in the form of what is called a framework.

The management of virtual VPXI infrastructures, like that of physical infrastructures, entails the possibility of acting on each resource of the physical infrastructure considered individually. Examples of physical structures allowing such action are described, as a non-limiting example, with reference to FIGS. 6A to 6E.

Figure 6A:
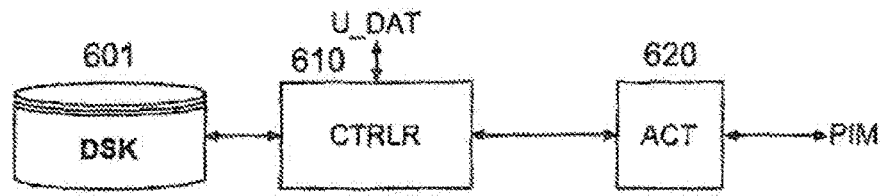
FIGS. 6A to 6E illustrate data handling equipment used in the infrastructures in FIG. 4, 5A or 5B for example.

FIG. 6A shows a data storage disk, DSK disk 601, matched with its capacity controller, CTRLR controller 611, which allows the exchange of useful read and/or write data or U_DAT data with the disk DSK 601. The controller CTRLR 611 is capable of causing the disk DSK 601 to operate in accordance with a set of functioning parameters.

The controller CTRLR 610 is matched with a unit which ensures its interconnection with a PIM manager in charge of the disk DSK 601. This unit, designated unit ACT 611 can be seen as an actuator in charge of executing instructions given by the PIM manager concerned, transmitted for example via the communication network shown as a dashed line in FIG. 4. These instructions may have a particular form. These instructions correspond to calls of CTRL( ) and CMD( ) functions pointed by the Substrate node 2760, Substrate link 2770 and/or Substrate router 2780 objects. In general the form of these instructions depends at least partly on the type of control/command equipment.

Figure 6B:
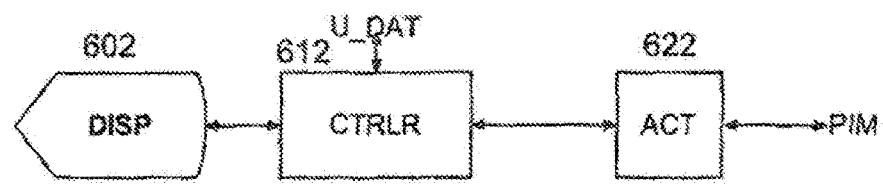
Figure 6C:
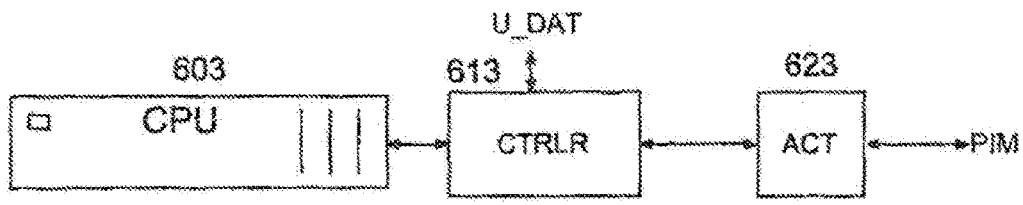
Figure 6D:
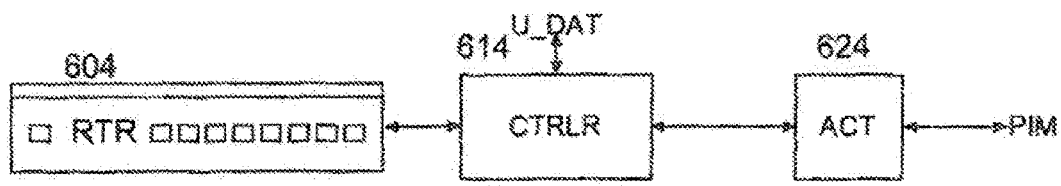
Figure 6E:

FIGS. 6B to 6E illustrate devices similar to those in FIG. 6A:

in FIG. 6B, a display device or DISP device 602 is linked to its respective controller CTRLR 612 itself linked to a unit ACT 622;

in FIG. 6C, a central processing unit or CPU 603 unit is linked to an ACT 623 unit via its controller CTRLR 612;

in FIG. 6D, a switch and/or router or RTR device 604 is linked to its controller CTRLR 614 which is linked to a unit ACT 624;

in FIG. 6E, a network access point or NAP point 605 is linked to an ACT 625 unit via its controller CTRLR 615.

In general, the PIM manager sends instructions to the ACT actuators on calls of the CTRL( ) and/or CMD( ) functions. In some cases, the recourse to an ACT actuator is not possible or not necessary. The data needed for configuration of control and/or command of the resource is then directly received by the controller CTRLR in the form of useful data designated U-DAT data in FIGS. 6A to 6E. This includes the case in which the useful data are directly entered into the equipment by a human operator, for example when manual reconfiguration of the equipment is necessary. The actuator ACT is capable of modifying at least some of the functioning parameters of its respective controller.

The actuator can be viewed as a management agent for a resource.

The management of resources in the infrastructure PI 200 requires management agents capable of holding control and command functions and a status register for each resource of the infrastructure. For the proper management of the infrastructure, each management agent must ideally be able to be permanently executed. The execution environment of the agent may depend on the type of physical resource to be managed. For example, when the resource has no execution (computing) means, the agent for its management may be moved to a different place of the infrastructure typically on the PIM manager 200 as is the case in particular for network links. It may then be advantageous to make provision for an agent common to all the resources to be managed at the PIM manager 200.

The controller is capable of modifying quantitative data on the maximum capacity of the resource of which it is in charge.

Figure 7:
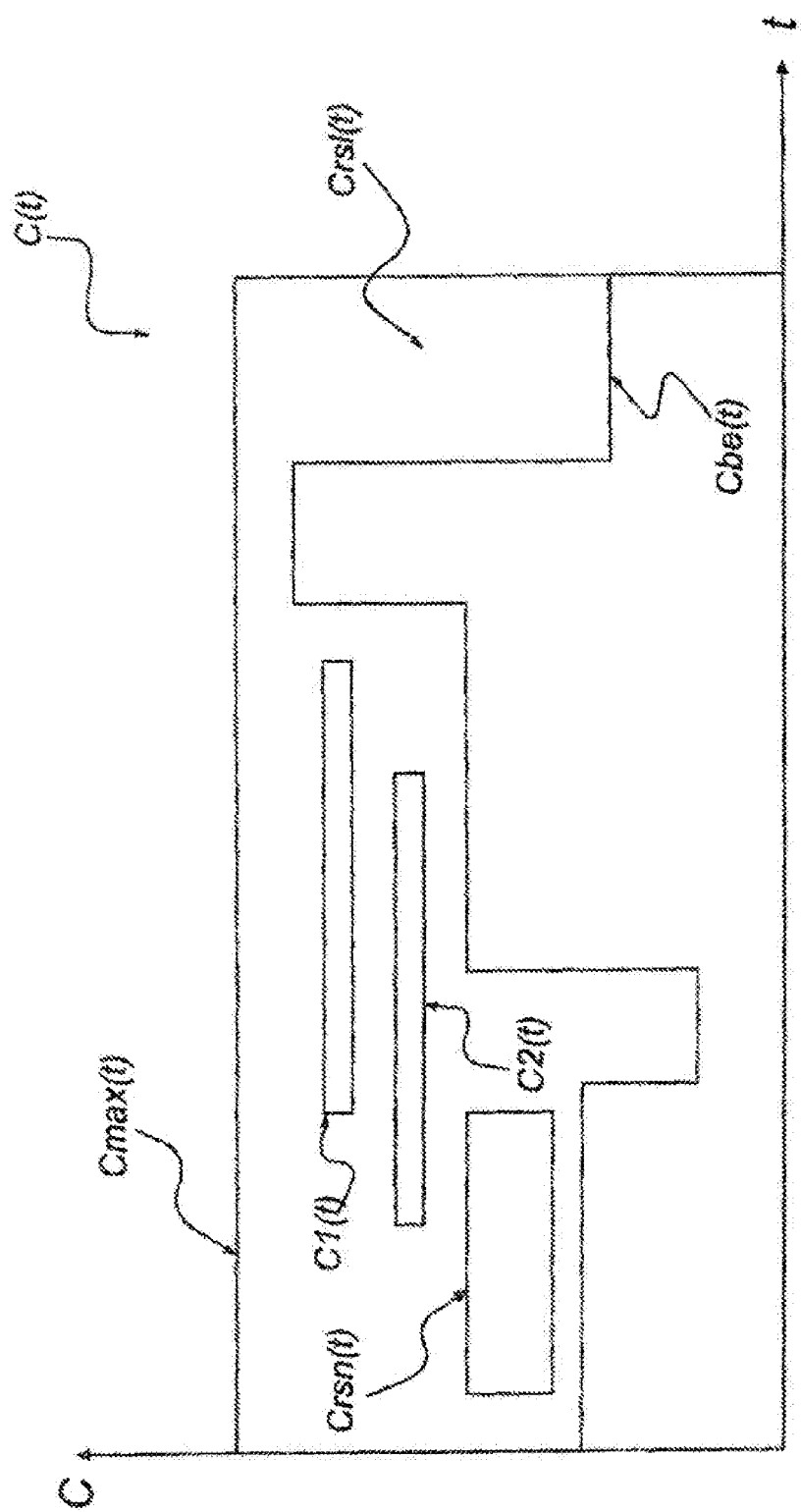
FIG. 7 illustrates a capacitive profile of a data handling resource.

FIG. 7 gives an example of what can be called a "time capacity profile" for a resource, designated as a C(t) profile.

A time profile C(t) can be determined for any physical resource of the infrastructure PI 200. A said profile can also be determined for any virtual resource.

The time profile C(t) of a resource is formed of all the variations concerning the functional capacity C of this resource over time t, or a period of time.

Any C(t) profile firstly comprises a time sub-profile of total capacity or Cmax(t) profile, corresponding to changes over time in the maximum functional capacity of the resource. In FIG. 7, the total capacity Cmax of the resource is constant over time, but this is only an example.

A C(t) profile may also comprise a set of time sub-profiles of reserved capacity, reserved each time for an infrastructure i. In general, the infrastructure i assumes the form of a virtual sub-infrastructure, typically a VPXI infrastructure without this being compulsory. The sub-profile of capacity reserved for the infrastructure i is denoted Ci(t). FIG. 7 therefore shows a reserved capacity sub-profile reserved for a first infrastructure 1 denoted C1($t$) and a reserved capacity sub-profile reserved for a second infrastructure 2 denoted C2($t$).

A reserved capacity sub-profile Ci(t) may comprise one or more reservation fragments i.e. a quantity of the resource capacity reserved for the part of infrastructure under consideration between two dates. To a reservation fragment there may correspond an integral capacity defined as the sum between these two dates of the corresponding part of the reserved capacity sub-profile.

A profile C(t) may also comprise a "best effort" capacity sub-profile, denoted Cbe(t). The Cbe(t) sub-profile corresponds to the capacity of the resource which is public and dedicated to so-called "best effort" service. This best effort capacity is not allocated to a specific part of the PI 200 infrastructure. When it is considered between two dates, this best effort capacity profile delimits a so-called best effort fragment representing an integral capacity. In other words, any resource whose total capacity can be divided between a non-guaranteed capacity and a guaranteed capacity comprises a C(t) profile with a best effort capacity Cbe(t). This is the case in particular for resources of communication type or which comprise an Internet link.

The C(t) profile may also comprise a reservation capacity sub-profile or Crvn(t) profile, corresponding to the capacity of the resource placed in reserve. The Crvn(t) profile may comprise fragments of reserve capacity.

Finally, the profile C(t) comprises a residual capacity sub-profile or Crsl(t) profile, which corresponds changes in time of the capacity of the resource which is neither allocated to a part of the infrastructure nor placed in reserve nor allocated to the BE service. This residual capacity is available for elements of the PI 200 infrastructure. It may be qualified as "reservable", "available" or "exposed" capacity.

The C(t) profile of a resource may be represented by a set of stepped time functions. Each function may assume positive values in all real numbers, rational numbers, integers or Boolean numbers as a function in particular of the possible dividing of the capacity of this resource. The function of a resource is construed as the function which this resource performs within the infrastructure, for example a computing or data processing function, a storage function, a communication function, a routing function, a display function, a data acquisition or capture function.

The measurement of the functional capacity C of a resource depends on the function of this resource. For example, the capacity associated with a communication function can be measured by a transmission rate of digital data expressed in bits for example, and the capacity associated with a storage function can be expressed in the form of a quantity of digital data expressed in octets for example.

At any time, the sum of the functional capacities allocated to a resource i.e. effectively allocated to an infrastructure, is less than or no more than the maximum capacity of this resource. The residual capacity of a resource which is also expressed in the form of a profile can be offered to an infrastructure or kept in reserve. In other words, the total capacity of a resource can be seen as the imbrication of all the profiles of allocated functional capacity and the profile of residual functional capacity. Each profile can be considered as a set of dated values of quantitative capacity data.

The allocation of a capacity fragment to an infrastructure is to be construed in the broad sense as indicating that, during the corresponding time period, the resource operates on behalf of the infrastructure under consideration. The part of corresponding capacity then forms a virtual resource of the infrastructure under consideration for the corresponding period of time. In other words, it amounts to saying that a fragment of capacity is allocated to an infrastructure or to a resource of this infrastructure.

One same physical resource may ensure different functions within the infrastructure, whether physical or virtual, but within a given time period this resource only ensures one single function called the "main" function.

Figure 8:
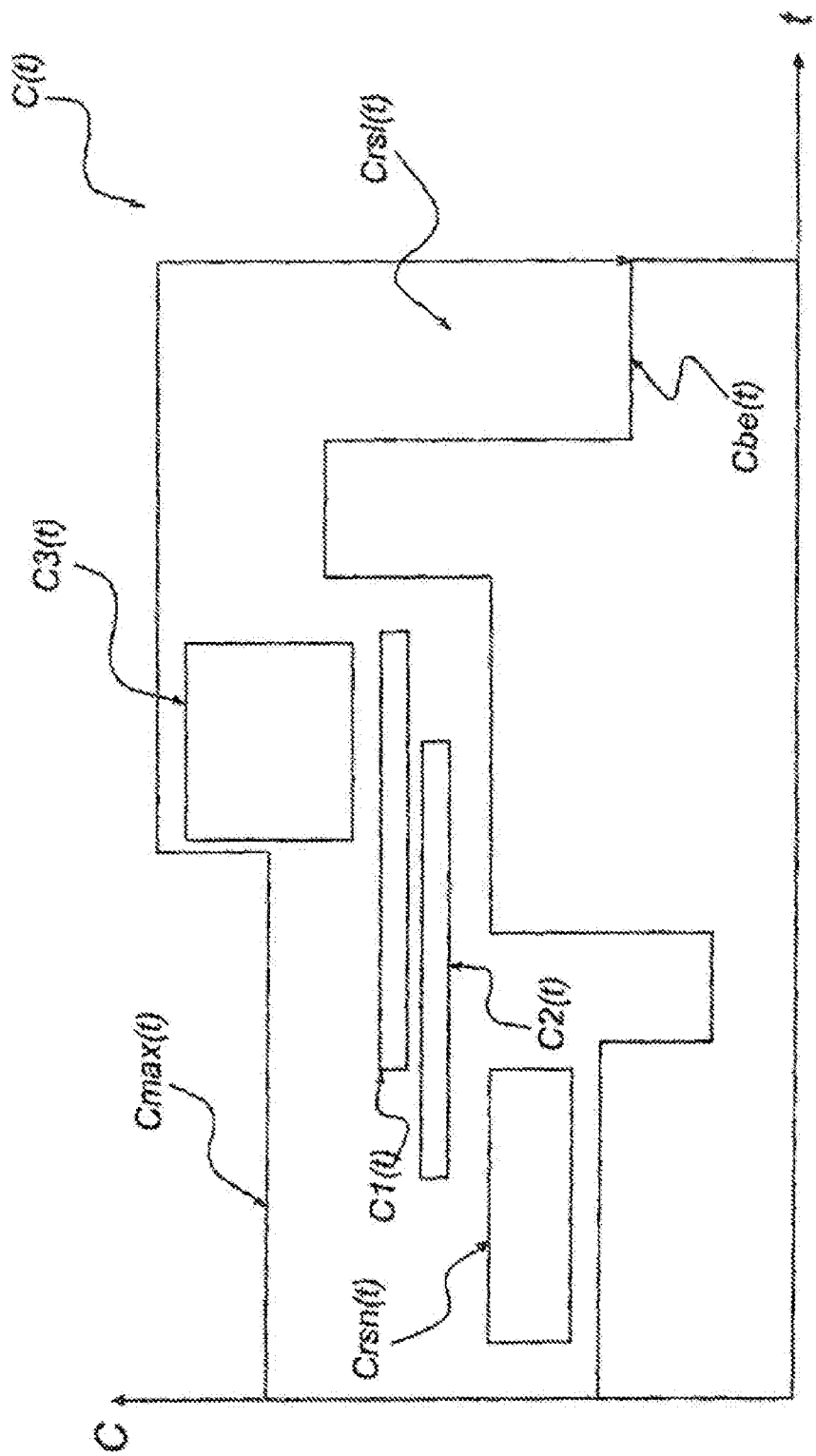
FIG. 8 is similar to FIG. 7 for another data handling resource.

FIG. 8 shows that the maximum capacity Cmax of a resource may come to be modified over time.

This may result for example from changes in supplies, from failures and the like. For example, the total capacity of a storage array increases on and after the time an additional hard disk is installed or conversely decreases as soon as there is ill-functioning of one of the disks of the array and up until this disk is repaired or replaced.

The total capacity of a resource may be also be modified after a new distribution of the resources of the network also called re-provision or re-provisioning.

For example, in an optical fibre communications network, an increase in maximum capacity may correspond to the illumination of an additional optical fibre in the network or to the activation of new wavelengths.

Again as an example, this may correspond to a modification of the parameters of a virtual machine, such as the size of a working memory, bandwidth quantity or computing power. In the particular case of a time capacity profile C(t) relating to a virtual resource, a variation in the maximum capacity Cmax, which may be temporary, may result from/ involve the redefining of this resource from the physical resource on which it is based. For example, this may correspond to an increase in the size of a data storage partition of a physical item of equipment and allocated to the virtual resource under consideration.

Here the memorizing of different profiles associated with the virtual and physical resources uses the computing objects defined in Annexes A.1.1.6 to A.1.1.9. Each profile may assume the form of a daemon executed on a controller of PIM controller or VIM controller type accordingly and/or stored in one of the bases RDB402 and VRDB502.

In particular, the list of time frames of a VXnode 2730, VXlink 2740 or VX router 2750 object may comprise a link to the profile of this virtual resource and/or a link to each physical resource involved in this virtual resource. When applicable this link may point to only part of a profile such as reserved capacity sub-profile. Most often, the capacity profile C(t) of a virtual resource is inferred from the capacity profiles of its constituent physical resources even virtual resources in some cases.

Similarly, a physical resource object may comprise a link to the time profile of this resource, kept for example as a physical attribute in one of the Substrate node 2760, Substrate link 2770 and Substrate router 2780 objects.

The PIM manager 400 may keep a capacity profile C(t) for each resource of the PI 200 infrastructure, in particular in the physical attributes of the Substrate Node, Substrate Link or Substrate Router objects. The capacity profile C(t) of a resource may also be stored in the resource itself, when the physical make-up of this resource so allows. In this case the Substrate Node, Substrate Link or Substrate Router objects may point to this profile.

The VIM manager 500 keeps a capacity profile C(t) for each virtual resource based on the PI 200 infrastructure. This is what is called a Time Frame in FIG. 28. This particularly allows VPXI infrastructures to be created by aggregation/ linking of capacity fragments of a virtual resource.

In addition, a virtual node and/a VPXI object can be created by aggregating non-allocated functional capacities of physical nodes (fragments). For example, on the same principle it is possible to create so-called "best effort" infrastructures by associating the best effort capacities of different physical resources.

A time capacity profile associates a capacity value with a time value (date). On this principle, it is possible to create time profiles for physical or virtual resources related to attributes of the resource other than its capacity. It is possible to determine security profiles authorising access for example to the resource only at certain times of the day, replication profiles according to which for example a resource (storage) is replicated during the day and not at night, or monitoring profiles according to which for example a resource is monitored on business days and not on public holidays.

A capacity profile can be determined for each virtual node since the latter is able to function simultaneously, successively or in turn for different VPXI infrastructures.

It is possible to determine time profiles for other attributes, in particular values relating to security, performance, geographical location, financial or energy cost of the resource under consideration.

The request Y in FIG. 5A may be a so-called "reservation" request via which the mobilisation is requested of at least part of the functional capacity of the resources of the physical infrastructure PI 200 for a given period of time.

The request Y may concern a given quantity of this capacity, in conformity with the dividable nature of this capacity. The reservation of the resource can be limited in time, and in this case expressed in absolute form i.e. delimited by two universal dates of the physical infrastructure PI 200, or may relate for example to a reservation start time and reservation period.

In general, a reservation request is more accurately a "pre-reservation" request since it concerns a future reservation of the functional resource capacity.

The request Y may also be a so-called "re-provision" request i.e. a request to modify the functional capacity of one or more resources of the infrastructure, even of all the resources of the infrastructure.

Most often, a request for re-provisioning concerns or involves the adaption or distribution of the resources of the physical infrastructure PI 200 in a different manner.

A re-provisioning request can be defined in absolute or relative manner and may or may not be limited in time.

The request Y may concern virtual elements or virtualized physical resources. In general, a request Y relates to a functional capacity and to a period of time whether or not dated, without indicating a particular item of physical equipment or virtual node.

Figure 9:
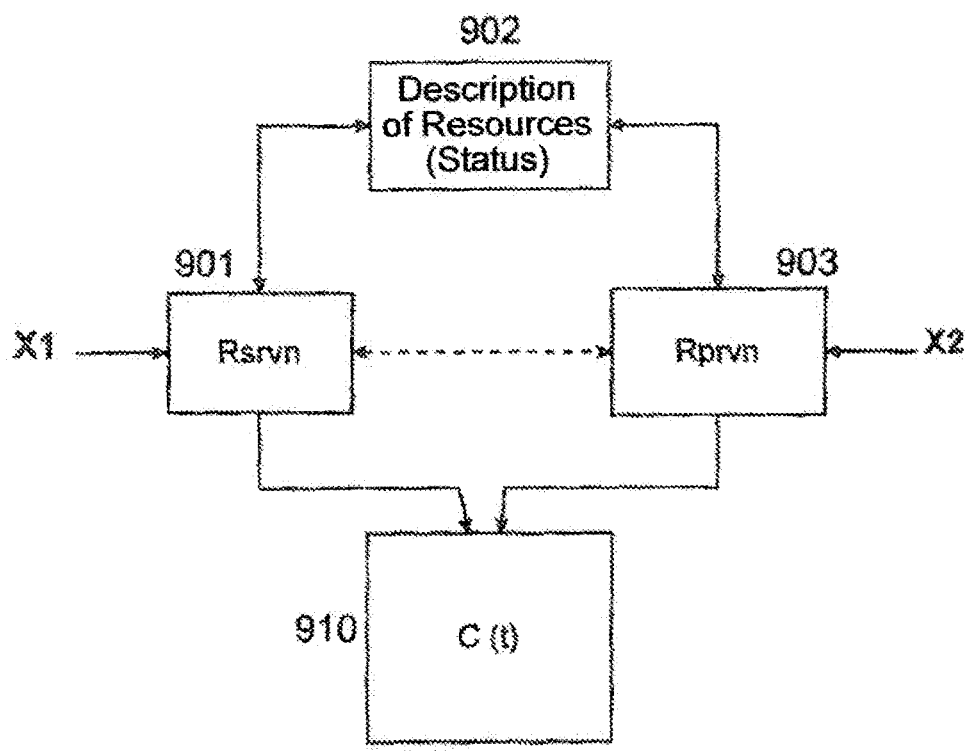
FIG. 9 is a functional diagram for part of the infrastructure manager in FIG. 4.

FIG. 9 illustrates the processing of a request Y1 similar to request Y in FIG. 5A, via the VIM manager 500.

The request Y1 is a reservation request. The VIM manager 500 implements reservation processing, denoted Rsrvn processing, represented by block 901.

Rsrvn processing 901 interacts with a description of the status of the resources of the infrastructure PI 200 or the virtual infrastructure VI, or RStat description represented by block 902. The RStat description 902 may have recourse to the profiles held in the base RDB 402 and/or VRDB 502. Rsrvn processing 901 results in a pre-reservation C(t) profile, block 910. This pre-reservation C(t) profile is stored in replacement of the initial profile of the resource for example.

FIG. 9 also illustrates the processing of a re-provision request Y2. The VIM manager 500 implements re-provision processing, or Rprvn processing, represented by block 903.

Rprvn processing 903 may interact with the RStat description 902 to determine a C(t) re-provision profile 910.

Rsrvn processing 902 may also involve Rprvn processing 903 as illustrated by the arrow shown as a thin dashed line in FIG. 9. This may be the case for example when the residual capacity of the resource profile is insufficient having regard to the capacity to be reserved further to request Y1.

Figure 10:
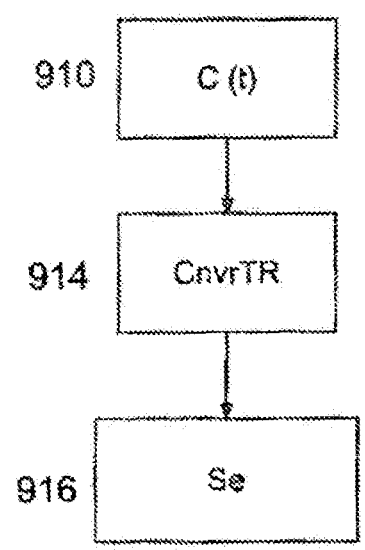
FIG. 10 is similar to FIG. 9 for another part of the manager.

As illustrated in FIG. 10, immediately or later, the profile C(t) can be applied to a converter Cnvtr 914 to obtain what is called here a "time series of capacity events" or series Se 916.

A series Se represents a chronologically ordered sequence of future dated events which trigger configuration and/or management actions of the resource under consideration further to variations in the C(t) profile of this resource.

Here a said series is said to have a "limited horizon" i.e. it only contain capacity events included between a start date BD and an end date ED, this end date ED being distant in time from the start date by a fixed period, or time horizon h. This series is also said to be "sliding" i.e. the start date BD is regularly moved forward as and when time passes.

The converter 914 can be viewed as interpreting the time capacity profiles.

Figure 11:
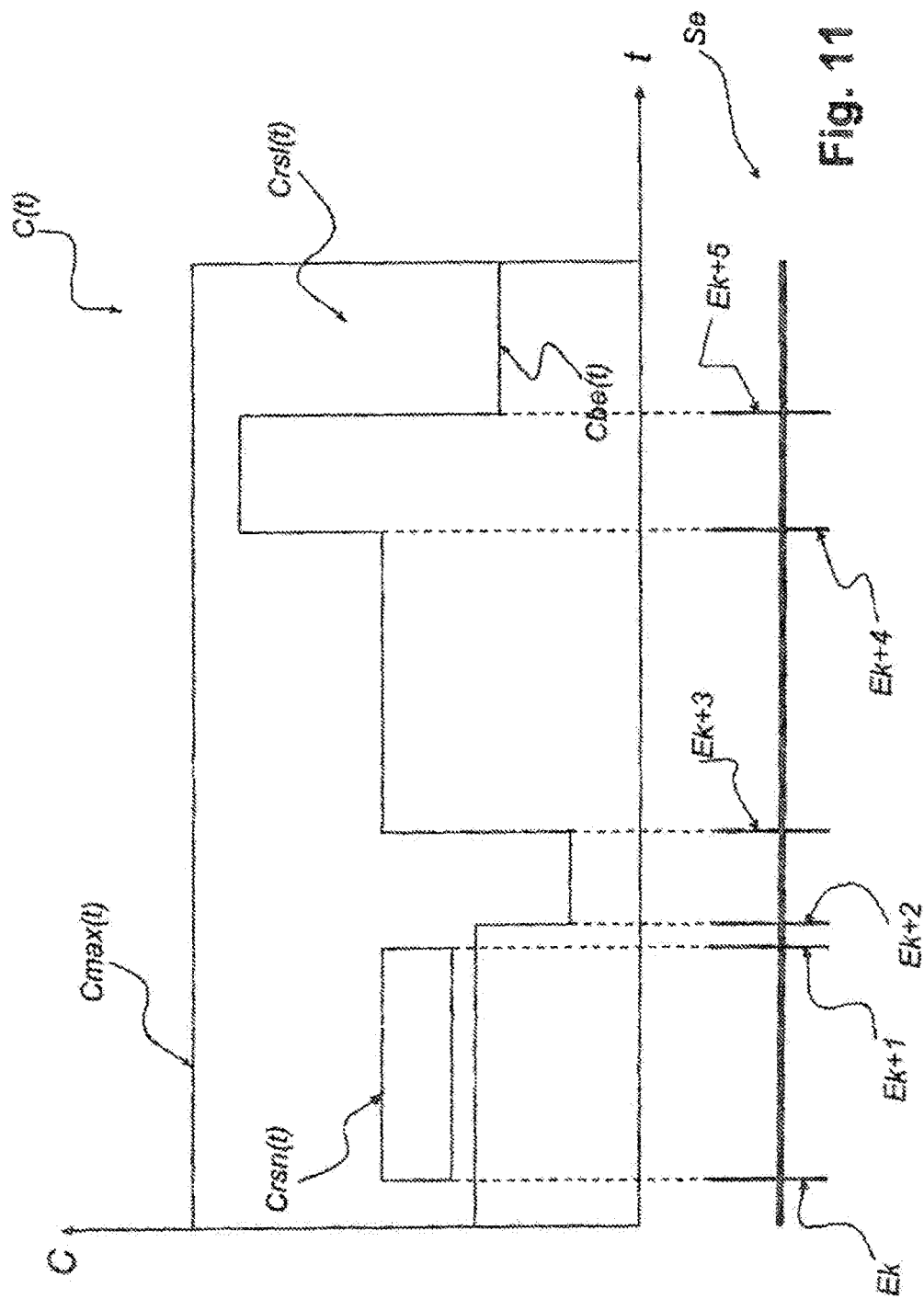
FIG. 11 is a graph illustrating a profile of a resource of the infrastructure in FIG. 4 and a series of corresponding time events.

FIG. 11 illustrates a series Se corresponding to the profile C(t) in FIG. 7.

The series Se comprises a set of computing triplets Ek, Ek+1, . . . , Ek+5, each comprising universal date data, capacity value data and pointer data towards a set of functions and/or parameters for configuration and/or management of the resource concerned. Each time the profile displays a modification of any capacity measurement, a triplet or event is generated accordingly. For example, the triplet event Ek+1 corresponds to the end of the placing in reserve of capacity Crsn(t).

Advantageously, the time series 916 assumes the form of a computing object such as defined in Annex A.1.1.4 in combination with the objects defined in Annexes A.1.1.3, A.1.1.5, A.1.1.1.

More generally, an event Ek interrelates a date, one or more command identifiers for the resource and a set of parameters for these functions determined according to a dated attribute value. In other words, it is possible to determine a time series Se for any profile describing a variation in a resource attribute over time.

The execution of a time series Se i.e. the call to the converter with a time horizon indication and the chronological call of each function and parameter in this series, at the adequate date, can be performed in part and at least for some physical resources by the PIM manager 200 in charge of this resource.

Figure 12:
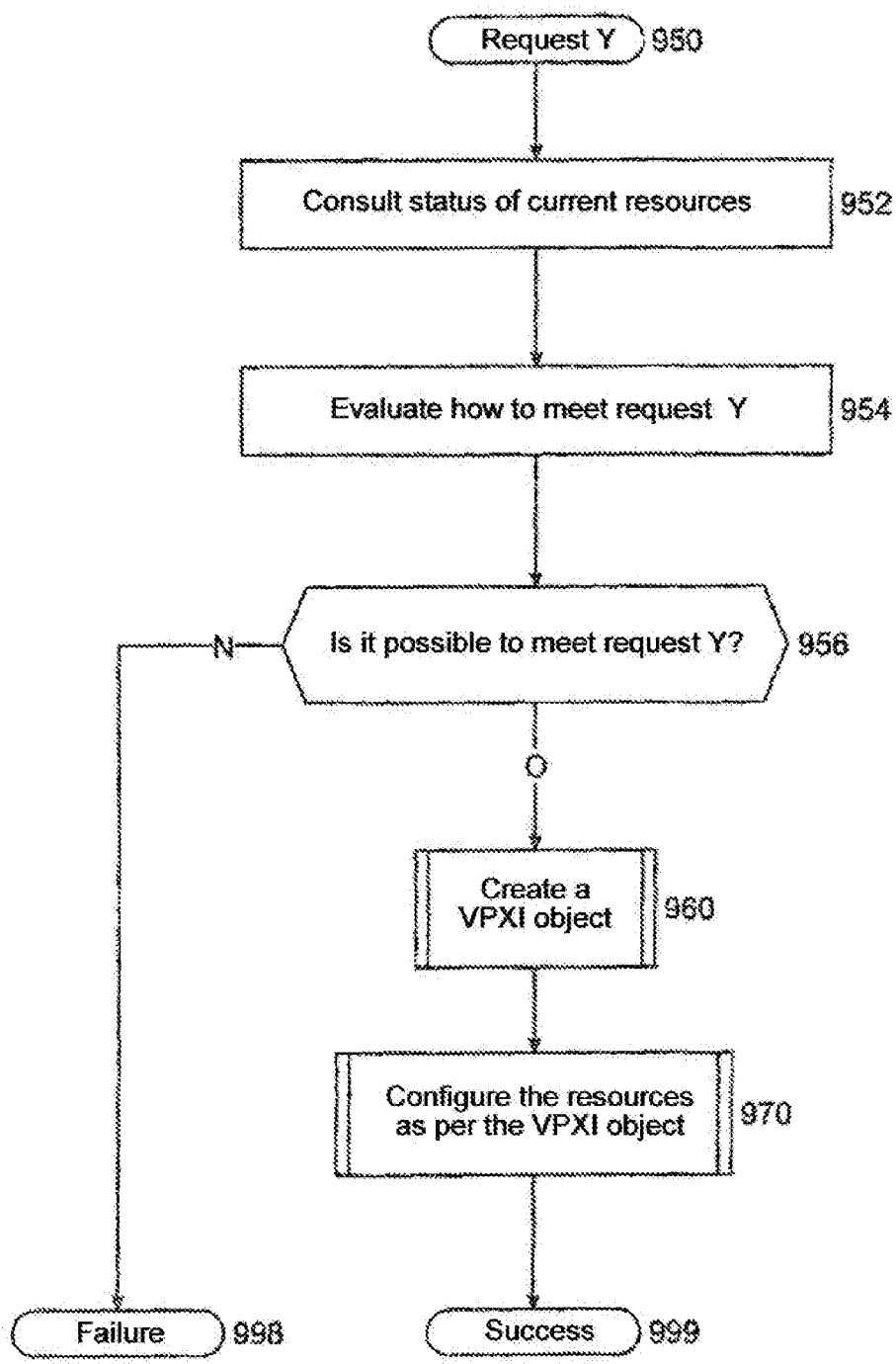
FIG. 12 is a flowchart illustrating the reservation processing in FIG. 9.

FIG. 12 illustrates the processing of a reservation request Y by the VIM manager 500.

As input, at step 950, the VIM manager 500 receives a request Y. This request comprises indications on functional capacity to be reserved, including the function itself and the "quantity" of this function concerned, on the reservation time period or at least a reservation start date, and optionally on the resource concerned (individualized).

At step 952, the VIM manager 500 consults the resource status of the infrastructure VI, such as indicated for example in the description of resources 901. This may be performed with the help of the resource profiles contained in the base VRDB 502 and/or RDB 402.

At step 954, the VIM manager 401 evaluates whether or not it is possible to meet the request Y, to which extent and how. This step 954 comprises a step at which the request Y is shaped to form to conform to the representation of the resources in the VRDB base 502. In other words, the request Y is stored in the same manner as functional nodes linked together by communication links. The request Y may specify the capacity of each functional node and each link.

The extent to which the request Y can be met is described further on.

If the request Y cannot be met, the VIM manager 500 returns failed processing of the request at step 998.

On the contrary, if the request Y can be met the VIM manager 500 creates a so-called "VPXI" object at step 960.

The creation of a VPXI object at step 960 particularly comprises the defining of the VPXI object under consideration, the storing thereof in an organized data structure and its allocation to the user who generated the request Y.

Advantageously the request Y can be submitted to the VIM manager in the form of a VPXI object, for example using a markup language conforming to standard XML.

Next, the resources of the physical infrastructure are virtually allocated as per this object at step 970. And the VIM manager 500 returns a success notice at step 999.

Figure 13:
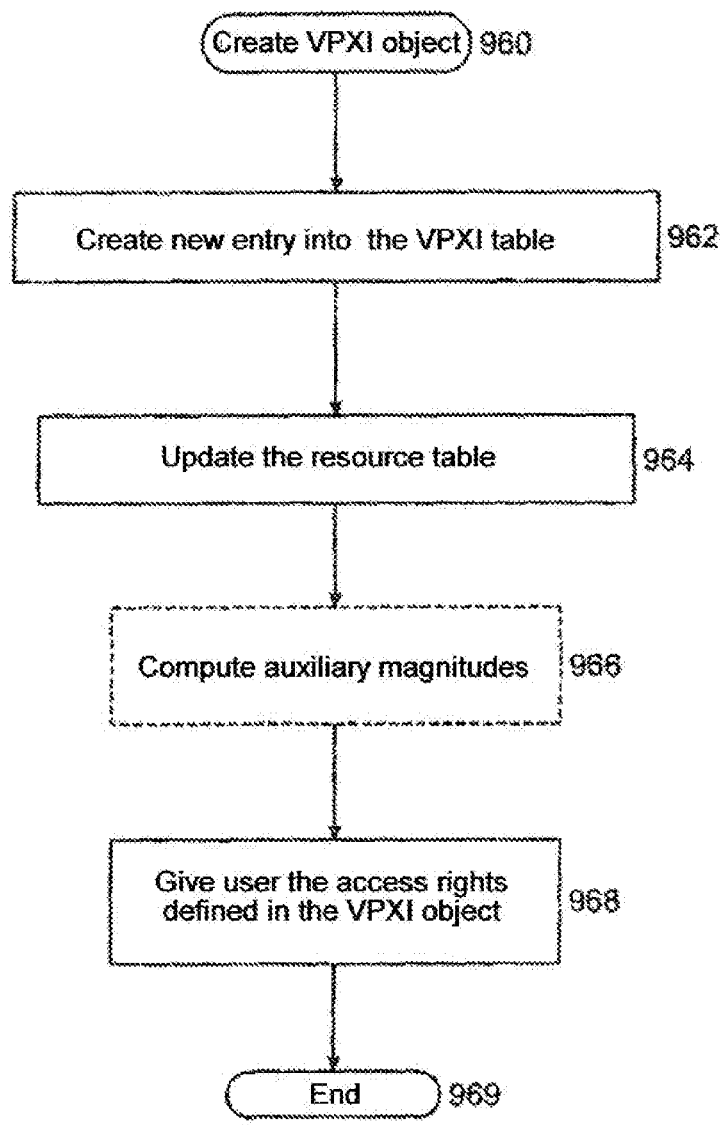
FIG. 13 is a flowchart detailing the operation 960 in FIG. 12.

The operation 960 in FIG. 12 is illustrated in more detail in FIG. 13.

The creation of a VPXI object starts at step 962 with the creation of new entry in a VPXI table such as illustrated for example in FIG. 27. For each VPXI object, this table interrelates inter alia VPXI object identifier data, user identifier data, a description of this object or a link to a said description, in terms of resources (links, nodes and routers in particular), a management function list and the topology of the VPXI object.

Then, at step 964, the table of resources of the infrastructure is updated. This comprises the interrelating of each of the resources involved in the VPXI object under consideration with the identifier of this VPXI object, and the placing in conformity of its time capacity profile. This includes the creation of a fragment of reserved capacity (period of reservation) in the capacity profile of the resource attributed to the VPXI object concerned. This generally involves the creation of a virtual node linked to the VPXI object and to a physical resource.

Operation 966 comprises the computing of auxiliary magnitudes. This operation is illustrated in dashed lines since it is optional.

This step 966 particularly comprises the updating of global variables, such as the "global residual capacity" variable of the infrastructure VI 400. Said variables are used to accelerate the allocation and scheduling phases which will be examined below. For example, if the value associated with the global residual capacity is lower than a predefined minimum value, the VIM manager 500 can be configured to refuse the processing of any reservation request for the corresponding period.

The operation 968 then gives the user the access rights defined in the VPXI object which has just been created. In one advantageous embodiment, the operation 968 further comprises the loading of the VPXI object just created in the form of a daemon.

Step 964 entails the updating and/or creation of a VPXI objet 2710, and of Vxnode 2730, Vxlink 2740, Vxrouter 2750 objects, and of Substrate node 2760, Substrate link 2770 and Substrate router 2780 objects.

It will have been understood that the operation 968 forms a response given to the user, a response further to the request emitted by this user. There is also a response for a re-provision request.

Which brings us to the end at 969.

In parallel, the resources further to the request just accepted must be configured. The user access to the reserved resources is prevented until proper configuration of the system, optionally before the reservation start date, and after the reservation end date. With the response, the management sends a reference which enables the client to collect access control elements which will only be active at adequate times.

Figure 14:
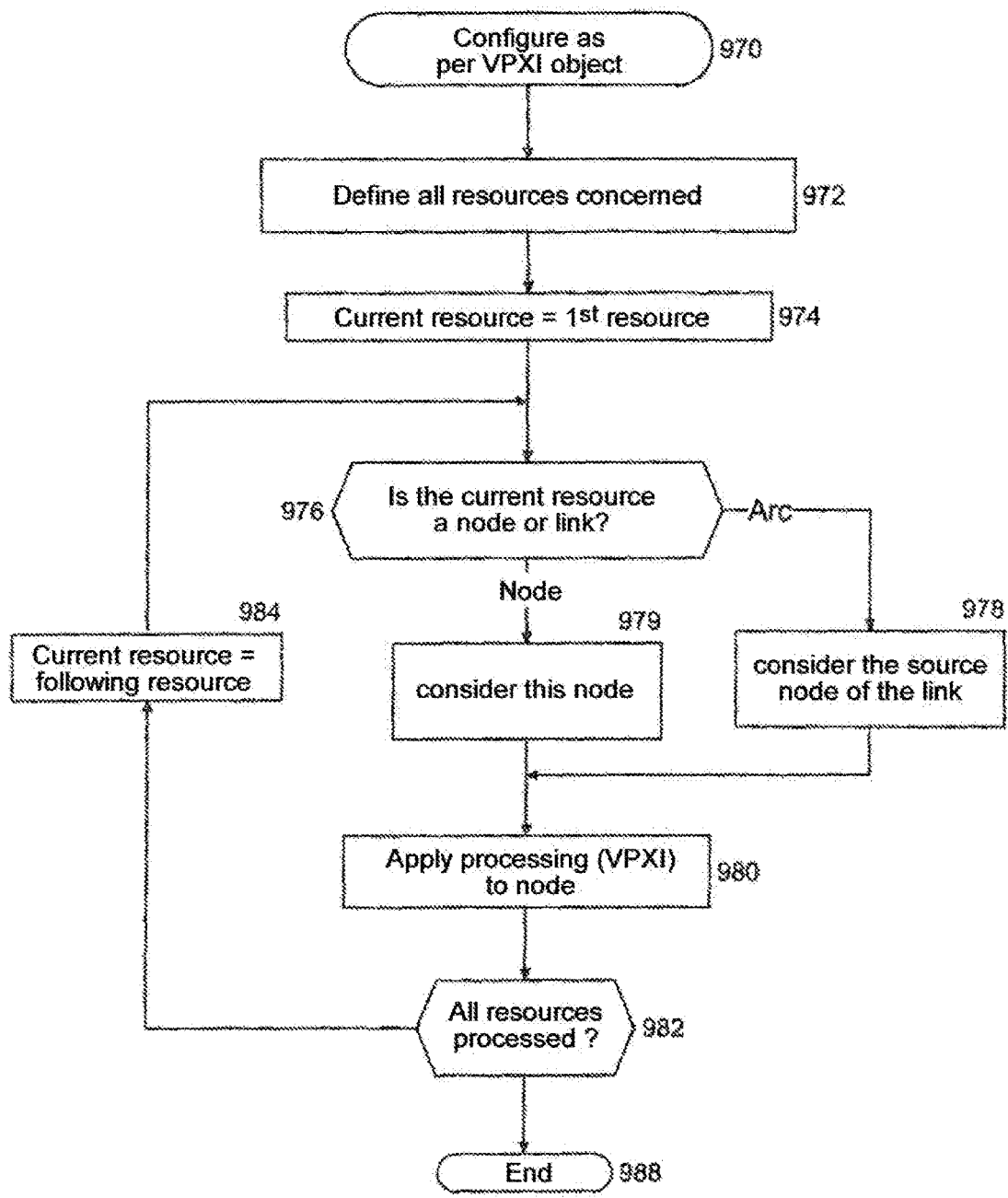
FIG. 14 is a flowchart detailing the operation 970 in FIG. 12.

FIG. 14 details step 970 in FIG. 13.

At step 972, a census is made of all the resources concerned by the VPXI object, and which are to be configured. This involves consulting the list of resources held in relation to the VPXI object concerned in the base RVDB 502.

A loop structure is then initiated by determining a first resource as current resource at step 974. It is then determined whether this current resource is a node or an arc (link) at step 976.

If the resource is a node, this node will be considered at step 979. If the resource is a link, the source node of the link will be considered at step 978. The source node of the link is the starting node for the communication performed on the arc or link under consideration.

Step 980 consists of applying processing to the node of steps 979 or 978 that is particularly defined for this node.

In a VPXI object, this processing can be considered as procedure relating to the node concerned, this procedure being defined in the VPXI object, for example by pointing to a particular procedure, with parameters, from among a predefined set of procedures. This generally involves the sending of piloting commands to the PIM manager 200. These commands can be viewed as the result of piloting function calls generally denoted PILOT( ) with effect on the PIM manager 200, schematically represented by the request X described above.

For example, a particular procedure may correspond to the dynamic deployment and start-up of a virtual machine image VMi, with pre-compiled operating system and executable programmes, on a particular machine Mk. Said procedure can be designated "Mkdeploy(VMi)" and forms an example of a CMD( ) function.

Again as an example, another particular procedure, for a transmission link, may correspond to the association of a virtual link indicator (VLi) with a guaranteed service capacity (GARANTEED) and a threshold rate value (MIN) on the port Pk.

Said procedure can be designated "E.Link Config. (Pk, VLi, GARANTEED, MIN).

To each type of resource there corresponds a group or set of predefined configuration procedures. These configuration procedures are transmitted to the physical node under consideration either directly or via the PIM manager.

The test 982 determines whether all the resources of the VPXI object have been processed. If this is not the case, it is moved onto the next resource at step 984 for which the steps 976 to 982 are reiterated.

When all the resources have been processed, the final step 988 is reached.

The processing of all the resources of a VPXI object can be performed in parallel, per resource, since these resources can generally be configured independently of each other. This allows global acceleration of the processing of a request Y.

Figure 15:
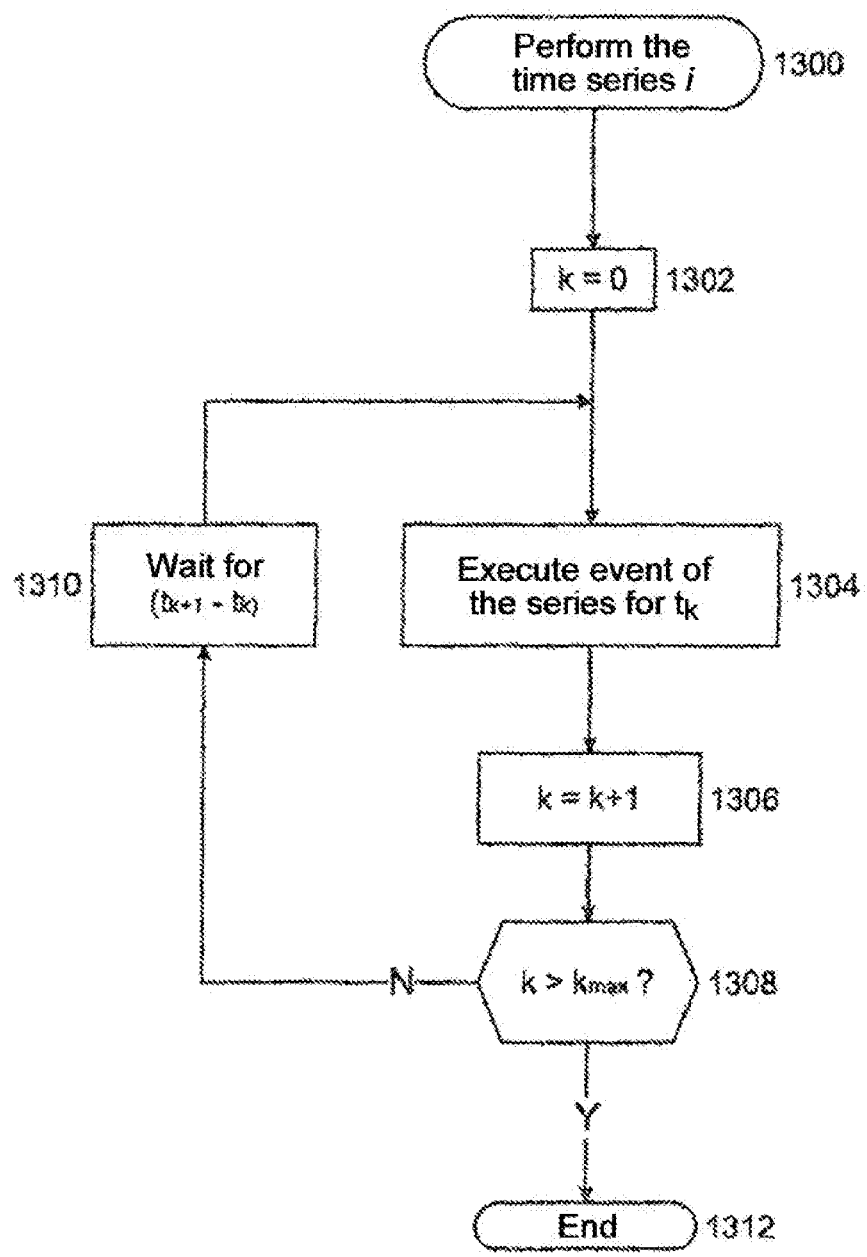
FIG. 15 is a flowchart illustrating the operating of a time series within a resource of the infrastructure in FIG. 4.

FIG. 15 illustrates how to make use of a given "time series i". After entry at 1300, step 1302 sets at 0 (for example) the value of the index k. Step 1304 then executes the event defined in the time series for time $T_k$ ($T_0$ for k=0). It is then moved onto the next event, of rank k+1 in the series. This is symbolized at 1306 by the fact that it is moved from k to k+1 (at this stage of 0 to 1).

Test 1308 determines whether or not the end of the series has been reached. If not, step 1310 consists of a wait for a time of $T_{k+1}$-$T_k$. After this time wait, the event of the series is executed for the new value of k, at 1304, and so forth until the test 1308 allows exiting towards the end step 1312.

The device in charge of operating a time series may be different equipment depending on the capacities of the physical resource under consideration. In some cases for example, when the resource involved comprises a computer, the resource itself operates its time series. In other cases, the resource merely responds to function calls corresponding to each of the events (receiving of instructions only).

The converter 914 is advantageously executed on the manager PIR 202.

In the foregoing, dynamic consideration was given to the functioning of the system. In practice consideration must also be given to its initialization.

Figure 29:
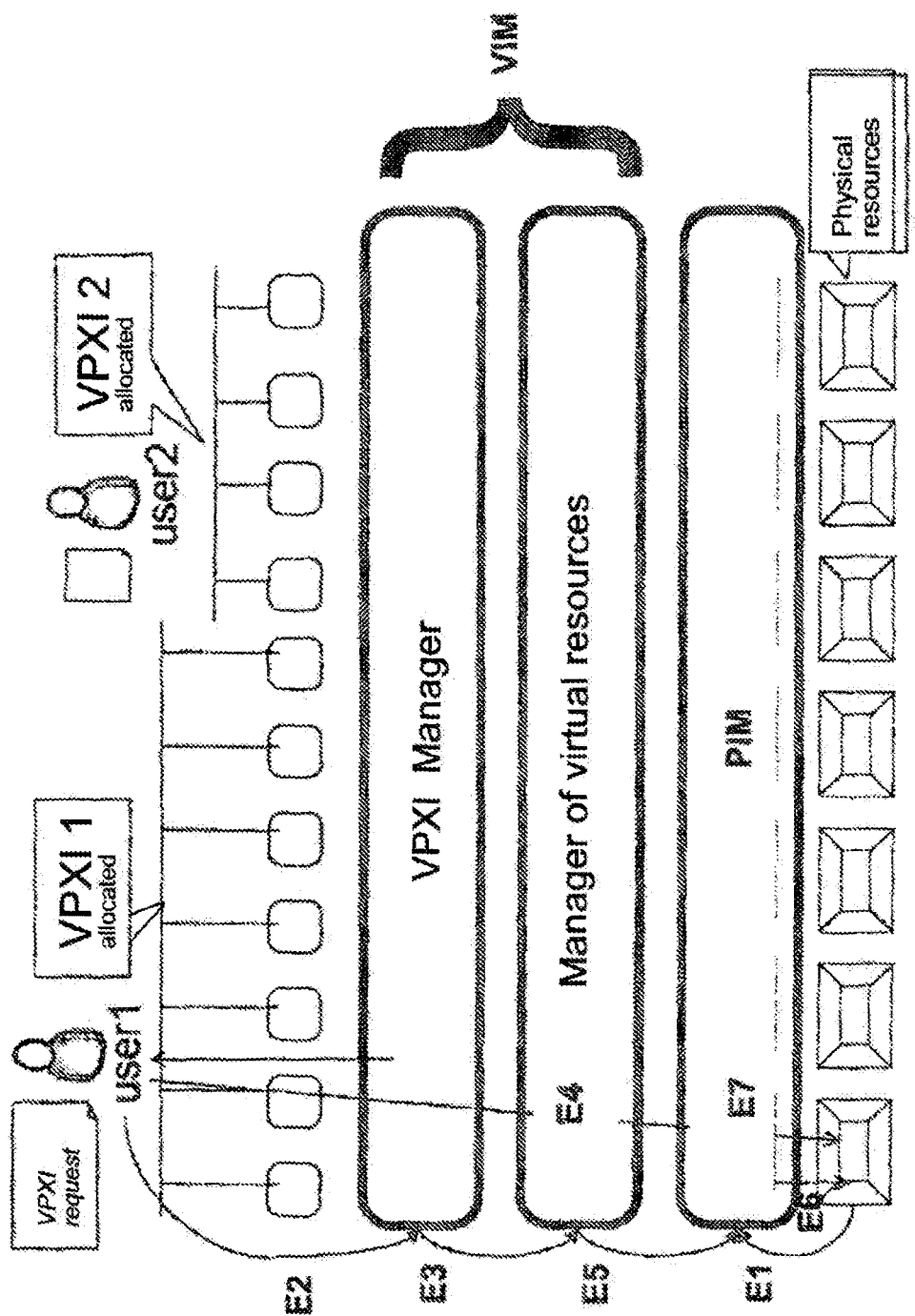
FIG. 29 is a schematic illustrating the initialization of the tool according to the invention.

Reference is made to FIG. 29 to describe this initialization process.

On initialization of the global system, a VPXI management daemon is loaded and a set of blank tables.

The VPXI manager takes on board a module of resource allocation which allows the setting up of virtual nodes responding to a VPXI request. Initial parameter setting, which may be manual, consists of entering general data into the different tables.

Each control daemon of a physical resource, namely each Substrate Node, Substrate Link and Substrate Router daemon in FIG. 28 depending on the type of resource concerned, is loaded and initialized during a registering operation of this physical resource with its respective PIM manager 400.

This registering which comprises the entry of data needed for creating an object of type R, may be automatic, resulting for example from the execution of a series of instructions in the form of a computer code, or it may be manual by action of the resource owner/manager. This registration triggers the initialization of the configuration procedures particular to each resource, in particular the CTRL( ) and CMD( ) functions.

The VXnode, VXlink and VXrouter daemons, which act as piloting daemons of virtual resources, are loaded and initialized as soon as they are allocated to a VPXI infrastructure by the VPXI manager.

The VPXI daemons which control the different VPXI infrastructures are loaded and initialized on activation of their respective VPXI infrastructure.

FIG. 29 shows that the described system globally functions along several major steps:

a first step E1 comprises the registration or declaration of resources in what could be called a resource "substrate". This registration is made with the respective PIM manager 400 of the resource.

A second step E2 corresponds to the submitting of a VPXI infrastructure request by a user.

A third step corresponds to the allocation of one or more virtual resources by the VPXI manager of the VIM manager 500 to a VPXI object.

A fourth step E4 corresponds to the activation of a VPXI infrastructure.

A fifth step E5 corresponds to the activation of a piloting function of the virtual resources in relation to their respective time frames.

A sixth step E6 corresponds to the activation of a physical resource command function via the PIM manager, for example a configuration function.

A seventh step E7 corresponds to the access and use of the fragment of physical resource by the user.

Figure 16:
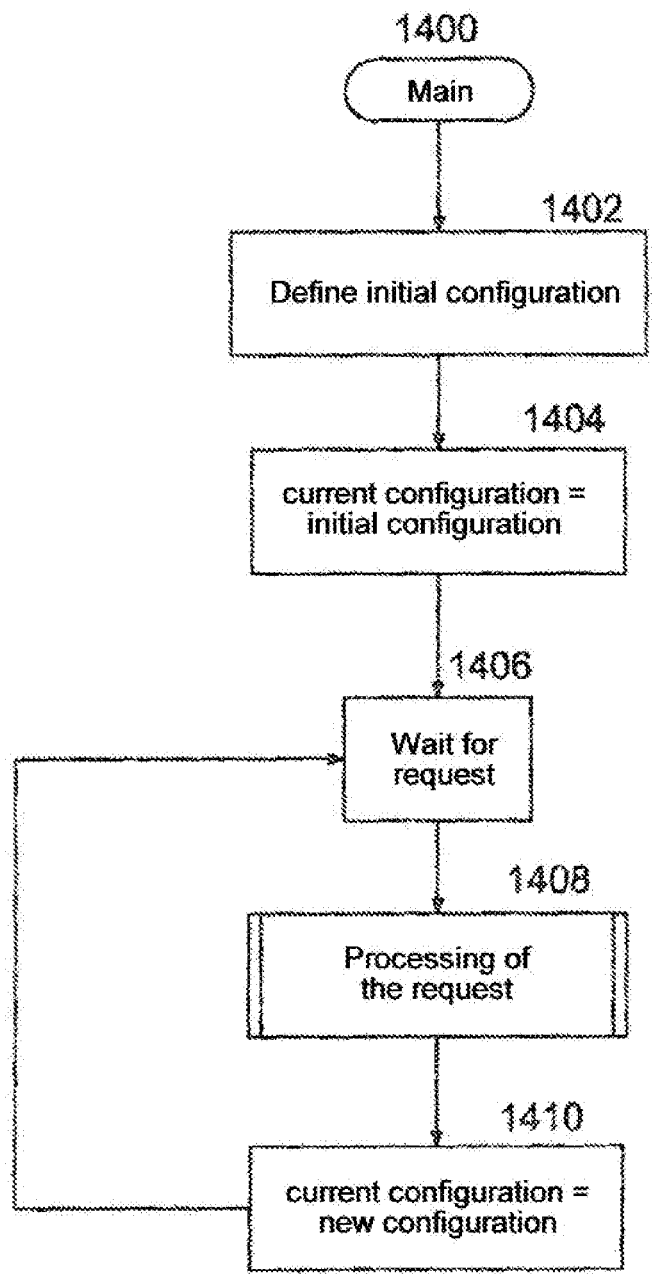
FIG. 16 is a flowchart illustrating the functioning of a virtual infrastructure manager.

FIG. 16 considers that this is processed via a main procedure. After start-up thereof at 1400, it establishes an initial configuration which is generally pre-determined and sets this initial configuration as the current configuration at 1404. A request is then waited for at 1406. When a request arrives it is processed in the manner previously indicated at 1408. The result is a new configuration which is set as the current configuration at 1410, after which a return is made to 1406 to await the following request.

It has been seen that the creation of a VPXI object involves the reserving of capacity fragments in the capacity profiles of each of the resources concerned by this VPXI object. In the same way as a physical or virtual resource has a time capacity profile, any VPXI object may also have a time capacity profile corresponding to the aggregation of its constituent resource capacity fragments. The profile of the VPXI object may in particular comprise a reserved fragment further to a VPXI object request, a fragment of available capacity or to be reserved, a fragment of "best effort" capacity which can be used without any other guarantee by any user of the infrastructure. This time profile or at least a link to this profile can be held in the storage structure which memorizes the VPXI objects. And this time profile can be submitted to the converter each time to obtain a time series.

Figure 17:
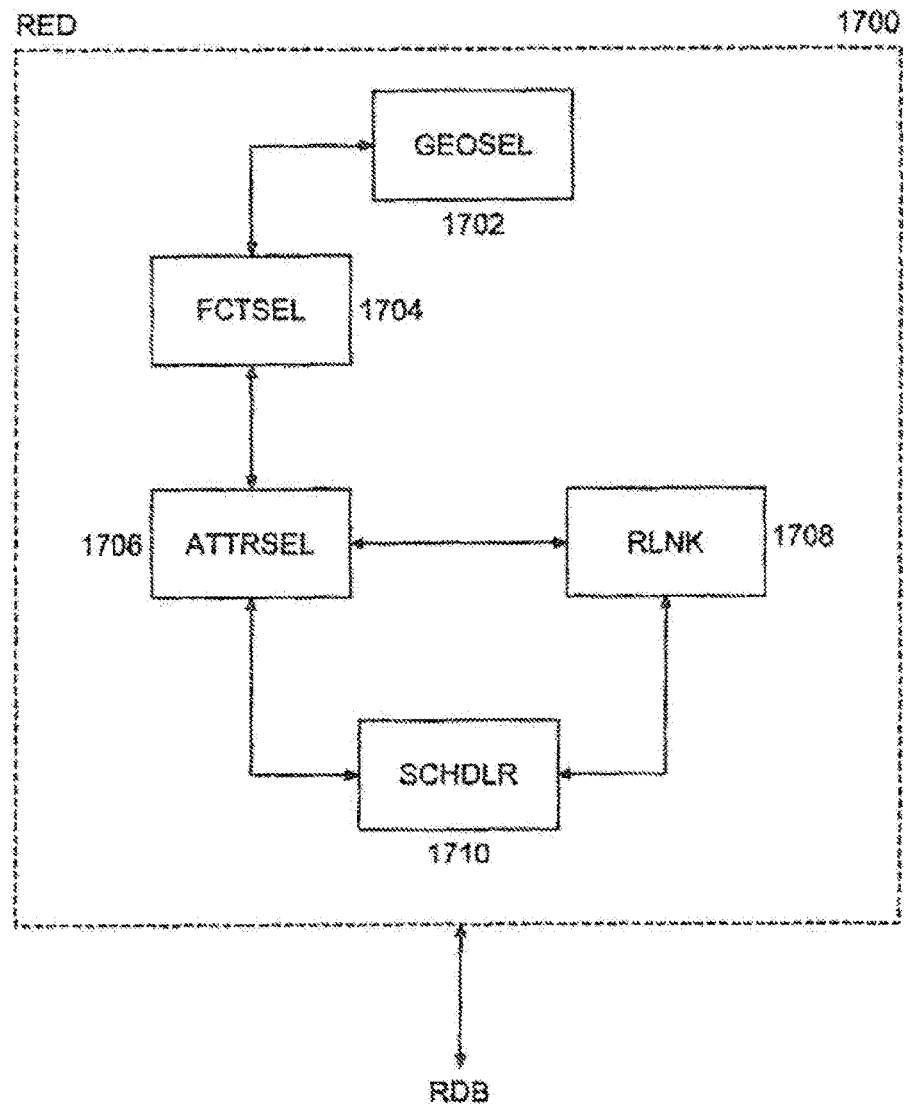
FIG. 17 illustrates a request evaluation device.

As shown in FIG. 17 the VIM manager 500 comprises a request evaluation device, designated device RED 1700, capable of interacting with the base VRDB 502 to determine whether a request Y submitted to it can be met and to which extent. This device may assume the form of a computing module executed at least in part on the VIM manager 500. In particular, this module may assume the form of a daemon. This module can also be designated a resource allocation module or Vxalloc module.

The RED 1700 device comprises a tool for the geographical selection of resources or GEOCEL tool 1702, adapted to select a subset of resources from the base VRDB 502 as per one or more geographical criteria drawn from the request Y. As complement or supplement, the selection of the subset of resources may take political criteria into account (membership of a Nation, a country, a government, an institution or other).

The RED 1700 device further comprises a tool for the functional selection of resources or FCTSEL tool 1704, adapted to select some resources from the VRDB 502 base in relation to functional attributes held in the base relative to the resources concerned. In particular the FCTSEL tool 1704 is arranged to determine this selection from among a subset of resources selected by the GEOSEL tool 1702.

The RED 1700 device further comprises a tool for selecting resources per attribute, or ATTRSEL tool 1706, adapted to receive at least part of the request Y and to output a subset of resources from the VRDB 502 base selected on the basis of attributes held in this base VRDB 402 relative to the resources concerned. In particular, the ATTRSEL tool 1706 is arranged to determine this selection from among a subset of resources selected by the FCTSEL tool 1704.

The RED 1700 device further comprises a tool for selecting links, or RLNK tool 1708, adapted to receive on its input a set of links and resources and to output a subset of selected links. The RNLK tool 1708 is able to operate on a subset of links and resources selected by the ATTRSEL tool 1706.

Finally, the RED 1700 device comprises a planning tool, or SCHDLR tool 1710, adapted to receive a set of resources and links, and to output an optimized subset of the said resources and links on the basis of cost minimization in relation to chosen criteria. The SCHDLR tool 1710 is arranged to operate on a subset of links and resources derived from the RNLK tool 1708 and/or the ATTRSEL tool 1706.

The assembly formed by the GEOSEL tool 1702, the FCTSEL tool 1704, the ATTRSEL tool 1706 and the RLNK tool 1708, can globally be considered inter alia as a resource selection tool or "resource selection".

Figure 18:
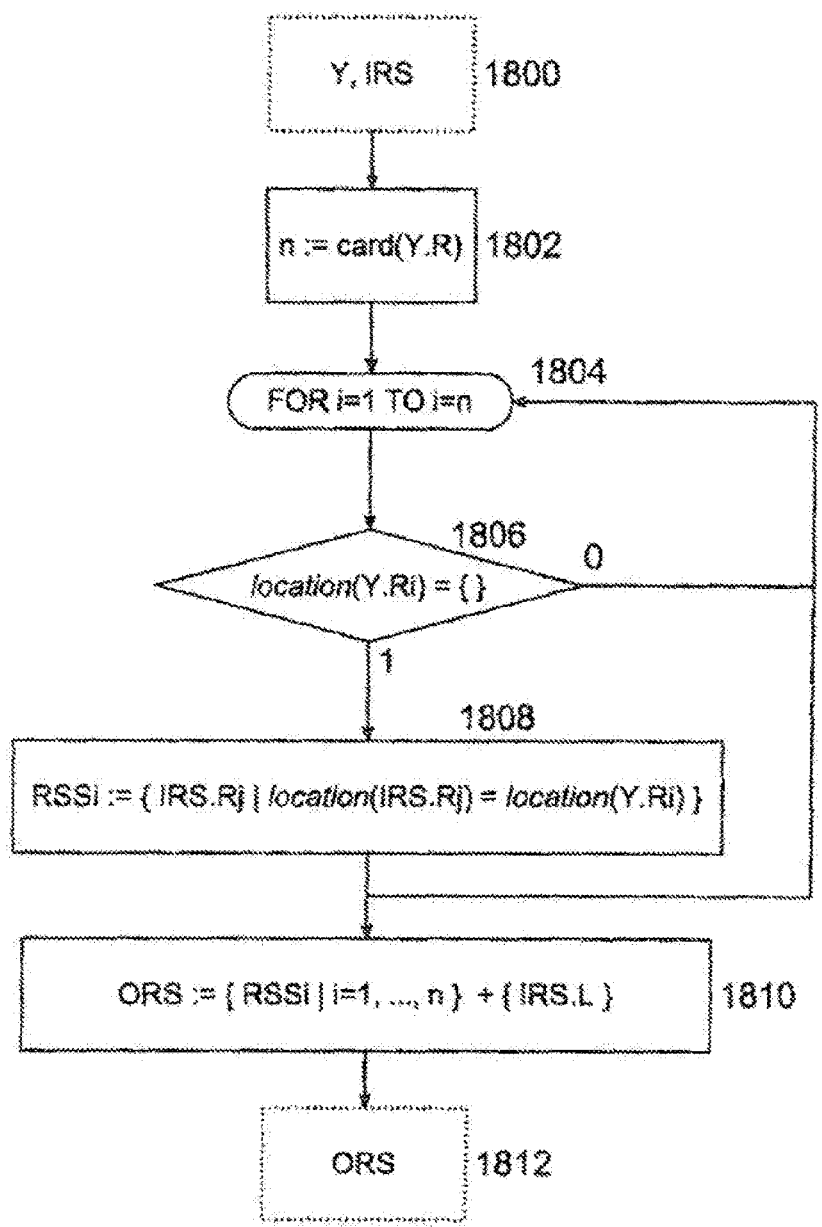
FIG. 18 is a flowchart illustrating a function of a tool of the device in FIG. 17.

FIG. 18 illustrates a first function of the GEOSEL tool 1702.

At the initial step 1800, the GEOSEL tool 1702 receives on its input the request Y or at least part thereof, and a subset of resources or input resource set, or IRS, from the base VRDB 502.

In one preferred embodiment, the GEOSEL tool 1702 is called before the other selection tools of the RED 1700 device so that the IRS set substantially corresponds to the set of the base VRDB 502.

At step 1802 the number denoted n is determined of resources concerned by the request Y, with the exclusion of the links. All these resources, excluding the links, are denoted Y.R for request Y.

At step 1804, a loop is initiated on the dummy variable "i" which progresses from 1 to n per unit increment.

At step 1806 a location function is called for a particular resource, denoted Ri, of the request Y. This function, defined in Annex A.2.1, returns a location attribute held in the request Y in relation to the resource Ri.

This location attribute can be explicit i.e. specified by the user who emitted the request Y. This location attribute may also be implicit i.e. inferred from data on the user concerned, known to the system and/or from knowledge of users or resources located in the proximity of the user/emitter of the request Y.

At step 1806, it is tested whether the set returned by the location function is or is not empty.

If the test at step 1806 is positive i.e. if no location attribute is associated with the resource Ri of the request Y, then the following resource Y.Ri is processed (the variable "i" is incremented).

If the test at step 1806 is negative i.e. there is a location attribute related to the resource Y.Ri, then at step 1808 a subset of result-resources is selected for the resource Y.Ri, or subset RSSi, comprising all the resources Rj of the IRS set whose location attribute such as returned by the location function corresponds to the location attribute of the resource Ri of the request Y.

Steps 1806 and 1808 are repeated for the following resource Y.Ri.

At step 1810, an output resource set or ORS set is determined comprising each of the RSSi subsets and the links of the IRS set generally denoted IRS.L.

At step 1812, the GEOSEL tool 1702 returns the ORS set as result.

Figure 19:
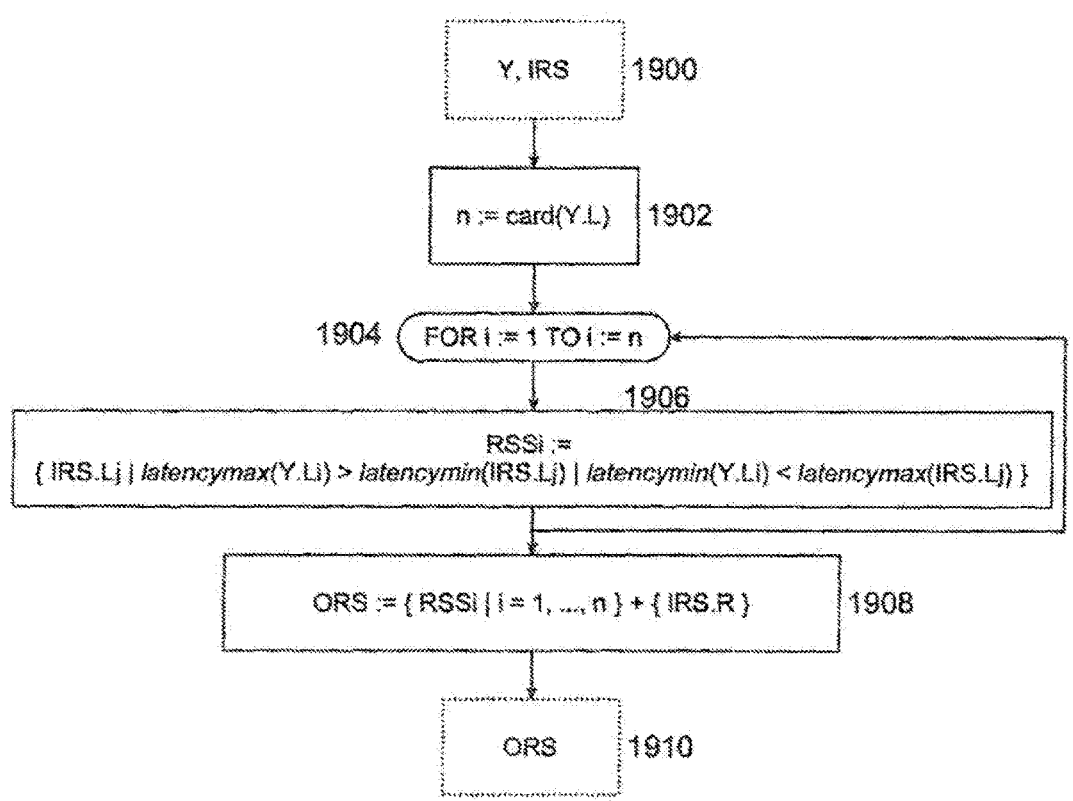
FIG. 19 is a flowchart illustrating another function of the tool in FIG. 18.

FIG. 19 illustrates a second function of the GEOSEL tool 1702.

At step 1900, this second function of the GEOSEL tool 1702 receives a request Y and a set of input resources or IRS set.

In one preferred embodiment, the IRS set of step 1900 corresponds to the OSR set output from the first function of the GEOSEL tool 1702.

At step 1902, the number, denoted n, of links Li contained in the request Y is determined. All the links concerned by the request Y are denoted Y.L.

At step 1904, a loop is initiated on the same dummy variable "i" which is incremented in units from 1 to n.

At step 1906, a result-subset RSSi is determined for a particular link, denoted link Li. The Rssi subset comprises the links Lj of the IRS set such that:

the result of the call of the Latencymax function for the link Li of the request Y is greater than the result of the call of the Latencymin function for the link Lj under consideration, and such that:

the result of call of the Latencymin function for the link Li of the request Y is smaller than the result of the call of the Latencymax function for this link Lj.

The functions Latencymax and Latencymin are respectively defined in Annexes A.2.2 and A.2.3.

Step 1906 is recommenced for the following link Li (the dummy variable i is incremented by 1).

At the end of the loop, at step 1908, a resource-result set denoted OSR is defined. The OSR set comprises each of the subsets RSSi and the resources, excluding the links, of the ISR set generally denoted ISR.R.

At step 1910, the ORS set is returned as result of the second function of the GEOSEL tool 1702.

Figure 20:
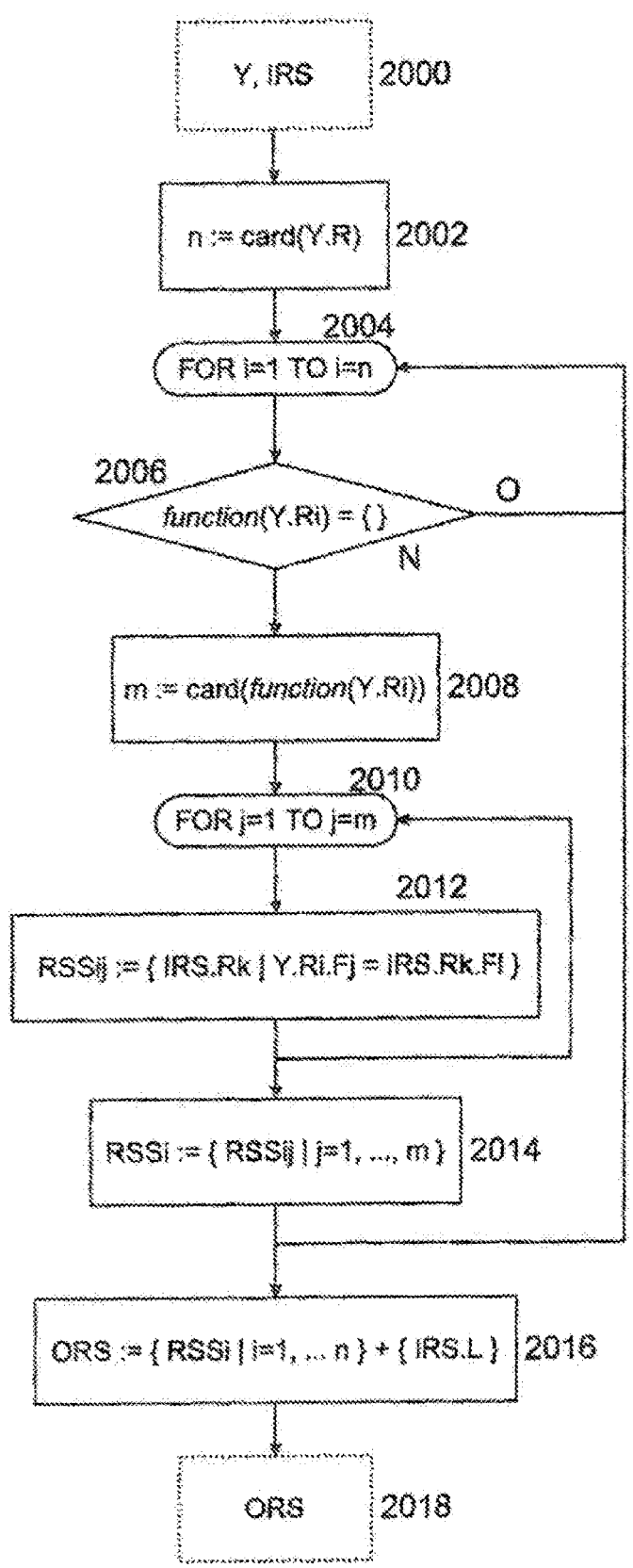
FIG. 20 is a flowchart illustrating the functioning of another tool of the device in FIG. 17.

FIG. 20 illustrates the functioning of the FCTSEL tool 1704.

At step 2000, the FCTSEL tool 1704 receives a request Y and a set of input resources denoted IRS.

In one preferred embodiment, the IRS set received at step 2000 corresponds to the ORS set output from the GEOSEL tool 1702, in particular from the second function of this tool.

At step 2002, the number n of resources R concerned by the request Y is determined, excluding links. All these resources are denoted Y.R.

At step 2004, a loop is initiated on the dummy variable "i" which is incremented in units from 1 to n.

For a particular resource, denoted Ri, of the request Y the function function defined in Annex A.2.4 is called. If the result of this call is the empty set (step 2006) then this step 2006 is recommenced for the following Ri object.

Otherwise, at step 2008, the number denoted m of functions is determined that are returned by the call of the function function.

At step 2010, a loop is initiated on the dummy variable j which is incremented in units from 1 to m.

For a particular function denoted Fj the subset of result-resources is determined for function Fj of resource Ri, denoted RSSij. The RSSij subset comprises the resources Rk of the IRS set of which one of the associated functions, denoted F1, corresponds to the function Fj concerned. This forms step 2012.

Step 2012 is then recommenced for the following function Fj of the same resource Ri.

At step 2014, a subset of result-resources is determined for the resource Ri, denoted RSSi. The RSSi subset comprises each of the subsets RSSij.

Steps 2006 to 2014 are then recommenced for the following resource Ri.

At step 2016, the result-set OSR is determined comprising the subset RSSi of each of the resources Ri, and all the links of the IRS set denoted IRS.L.

Finally, at step 2018 the OSR set is sent as result.

Figure 21:
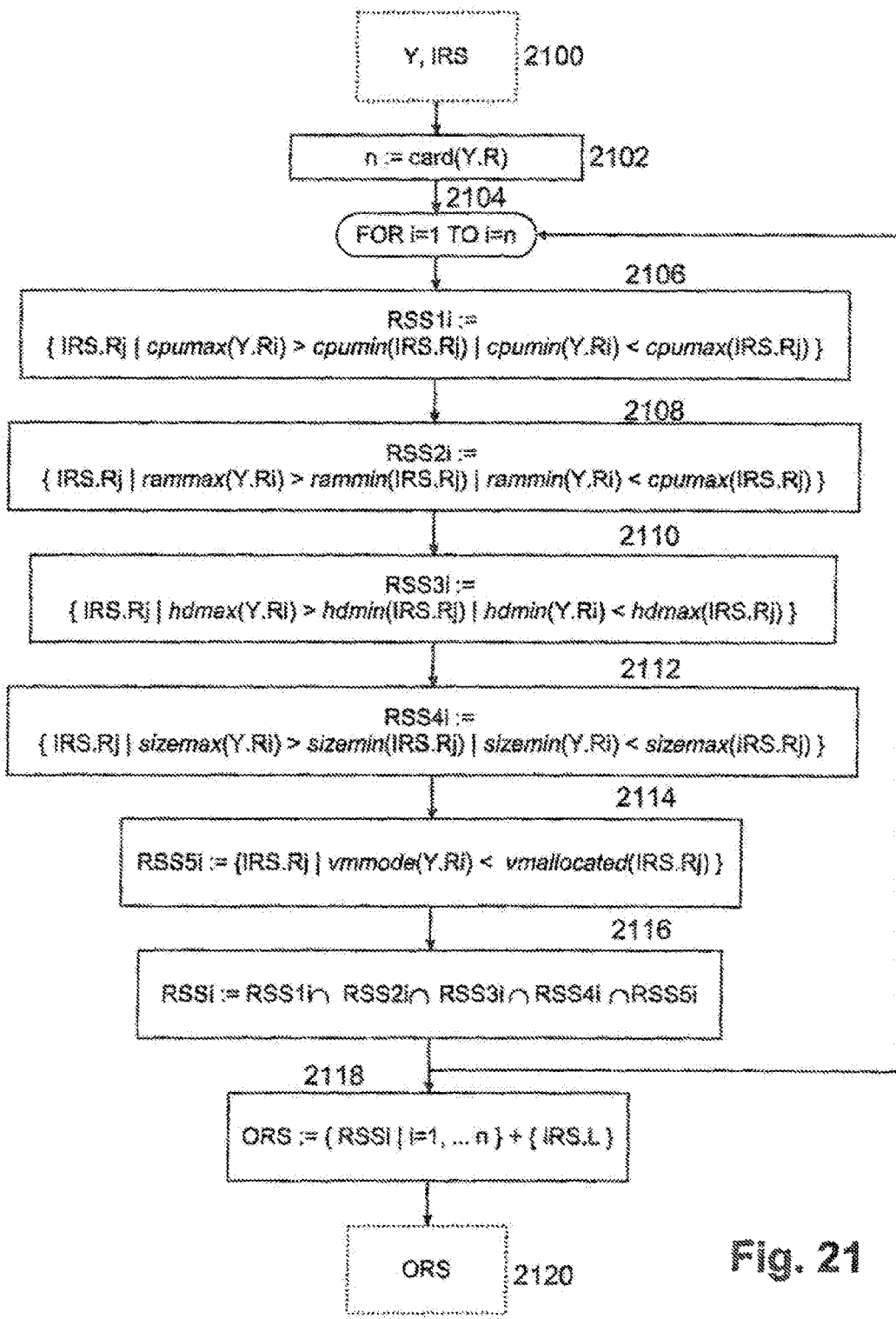
FIGS. 21, 22 and 23 are flowcharts respectively illustrating different functions of yet another tool of the device in FIG. 17.

FIG. 21 illustrates a first function of the ATTRSEL tool 1706.

At step 2100, the ATTRSEL tool 1706 receives the request Y and a set of resources IRS. The IRS set received at step 2100 may or may not correspond to the ORS set delivered by the FCTSEL function 1704.

At step 2102, the number n of resources R is determined, excluding links, concerned by the request Y.

At step 2104, a loop is initiated on the dummy variable "i" which is incremented in units from 1 to n.

At step 2016, a first subset of result-resources RSSIi is determined for a particular resource, denoted Ri. This subset RSSIi comprises the resources Rj of the IRS set such that:

the result of the call of the cpumax function, such as defined in Annex 2.3.6, for the resource Ri of the request Y is greater than the result of the call of the cpumin function, such as defined in Annex A.3.7, for the resource Rj under consideration, and such that:

the result of the call of the cpumin function for the resource Ri of the request Y is smaller than the result of the call of the cpumax function for the resource Rj of the IRS set.

At step 2108, a second subset of result-resources RSS2$i$ is determined for resource Ri, comprising all the resources Rj of the IRS set such that:

the result of the call of the rammax function, such as defined in Annex 2.3.8, for the resource Ri is greater than the result of the call of the rammin function, such as defined in Annex A.2.3.9, on the resource Rj under consideration, and such that:

the result of the call of the rammin function for the resource Ri is smaller than the result of the call of the rammax function for the resource Rj.

At step 2110, a third subset of result-resources RSS3$i$ is determined for resource Ri comprising all the resources Rj of the IRS set, such that:

the result of the call of the hdmax function, such as defined in Annex 1.3.10, for the resource Ri is greater than the result of the call of the hdmin function, such as defined in Annex 1.3.11, for the resource Rj under consideration, and such that:

the result of the call of the hdmin function on the Ri resource is smaller than the result of the call of the hdmax function for this resource Rj.

At step 2112, a fourth subset of result-resources RSS4$i$ is determined for resource Ri, comprising all the resources Rj of the IRS set, such that:

the result of the call of the sizemax function, such as defined in Annex A.3.12, for the resource Ri is greater than the result of the call of the sizemin function, such as defined in Annex 3.13, for the resource Rj under consideration, and such that:

the result of the call of the sizemin function for the resource Ri is smaller than the result of the call of the sizemax function for this resource Rj.

At step 2114, a fifth subset of result-resources RSS5$i$ is determined for the resource Ri, comprising all the resources Rj of the IRS set such that:

the result of the call of the vmmode function, such as defined in Annex A.3.13, for the resource Ri is smaller than the result of the call of the vmallocated function, such as defined in Annex 1.3.14, for the resource Rj under consideration.

At step 2116, a result-subset RSSi is defined for the resource Ri. This subset RSSi comprises the intersection of sets SR1$i$, SR2$i$, SR3$i$, SR4$i$ and SR5$i$ for the resource Ri.

At step 2118, a set of result-resources OSR is defined each comprising RSSi subsets corresponding to the resources Ri of the request Y and all the links of the IRS set, denoted IRS.L.

Finally, at step 2120 the OSR set is returned as result.

Figure 22:
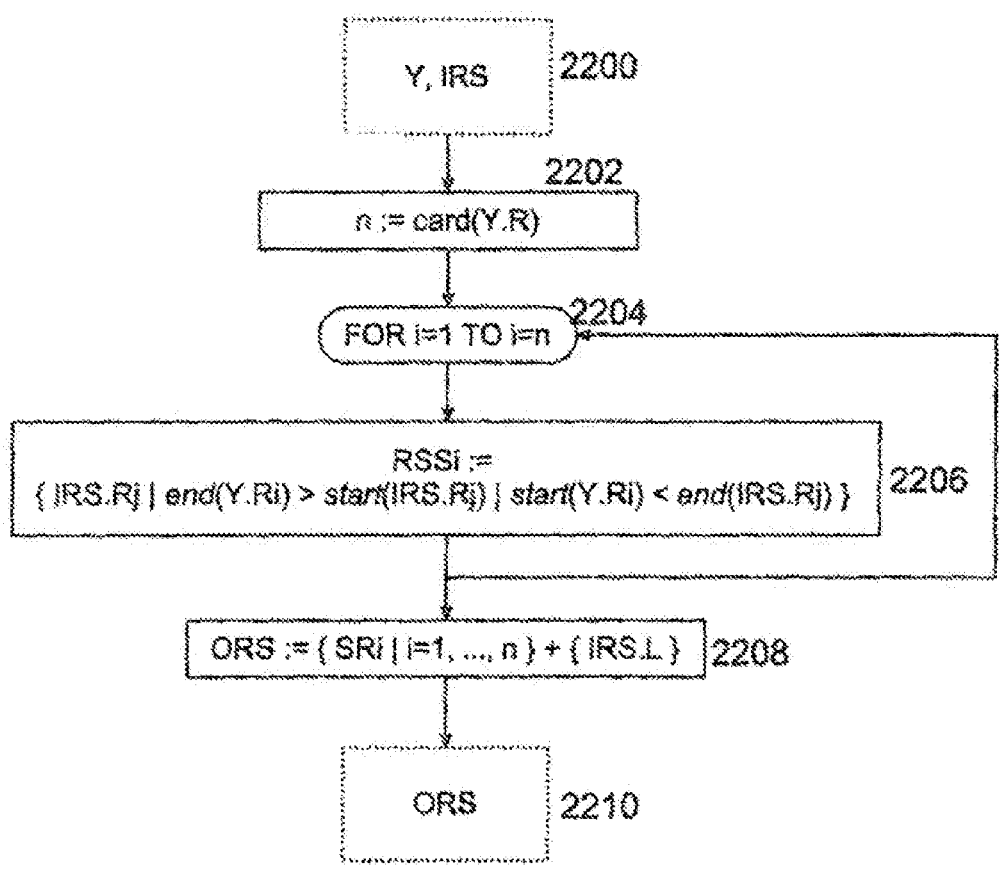

FIG. 22 illustrates a second function of the ATTRSEL tool 1706.

At step 2200, this second function of the ATTRSEL tool 1706 receives the request Y and a set of resources IRS.

Preferably, the IRS set received at step 2200 corresponds to the OSR set resulting from the call of the first function of the ATTRSEL tool 1706.

At step 2202, the number n is determined of resources Ri concerned by the request Y.

At step 2204, a loop is initiated on the dummy variable "i" which varies from 1 to n in increments of "1" ("one").

At step 2206, a subset of result-resources RSSi is defined for a particular resource, denoted Ri. The subset RSSi comprises all the resources Rj of the IRS set, such that:

the result of the call of the end function, such as defined in Annex A.3.15, for the resource Ri is greater than the result of the call of the start function, such as defined in Annex A.3.16, for the resource Rj under consideration, and such that:

the result of the call of the start function for the resource Ri is smaller than the result of the call of the end function for the resource Rj.

Next, step 2206 is recommenced for the following resource Ri.

At step 2208, a subset of result-resources OSR is defined comprising the subset RSSi of each of the resources Ri of the request Y, and all the links of the IRS set, denoted IRS.L.

At step 2210, the ORS set is returned as result.

Figure 23:
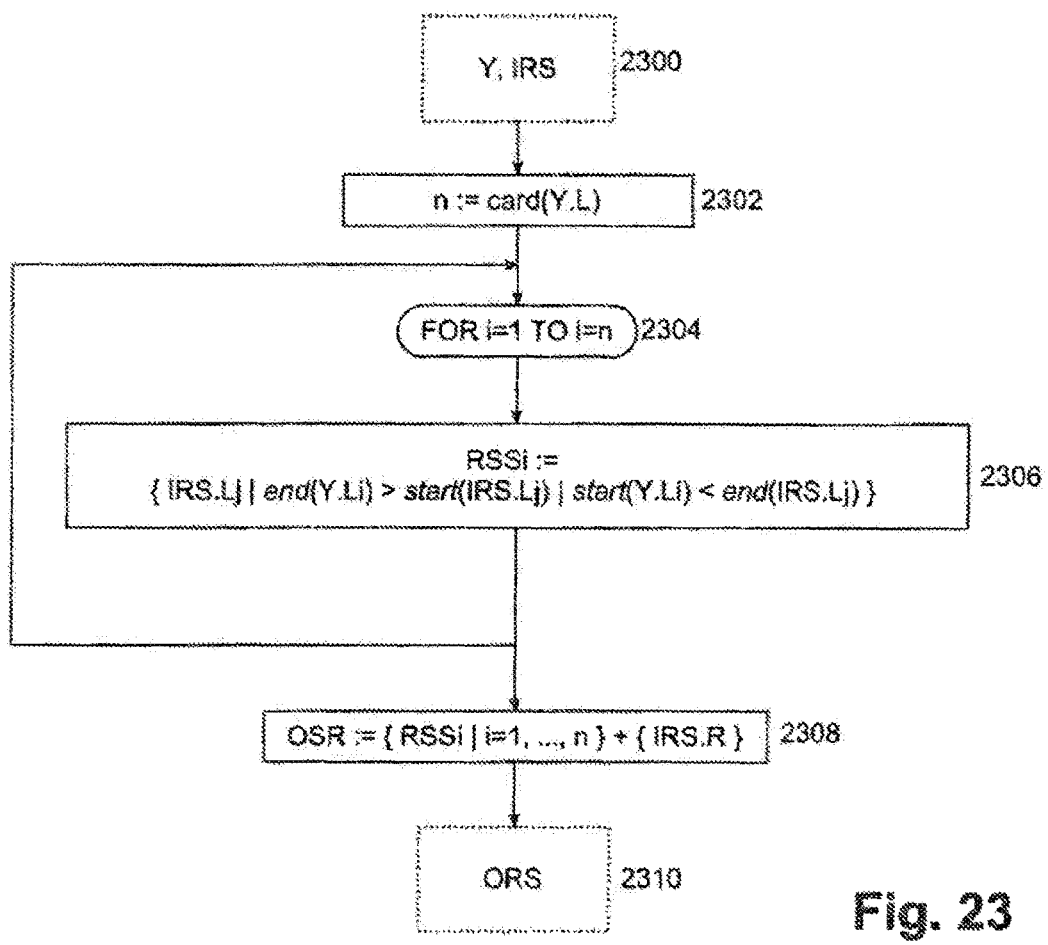

FIG. 23 illustrates a third function of the ATTRSEL tool 1706.

At step 2300, the third function of the ATTRSEL tool 1706 receives a request Y and a set of resources IRS.

Preferably, the set of resources IRS received at step 2300 corresponds to the OSR set resulting from the call of the second function of the ATTRSEL tool 1706.

At step 2302, the number n is determined of links L concerned by the request Y.

At step 2304, a loop is initiated on the dummy variable "i", this variable varying from 1 to n in increments of "1".

At step 2306, a subset of result-resources RSSi is determined for the link Li, comprising all the links Lj of the IRS set, such that:

the result of the call of the end function on the Li link is greater than the result of the call of the start function on the link Lj of the IRS set, and such that:

the result of the call of the start function on the link Li is smaller than the result of the call of the end function on the link Lj of the IRS set.

Step 2306 is then recommenced for the following link Li of the request Y.

At step 2308, a set of result-resources OSR is defined comprising the subset RSSi of each of the links Li of the request Y, and all the resources of the IRS set denoted IRS.R.

Finally, at step 2310, the ORS set is returned as result.

Figure 24:
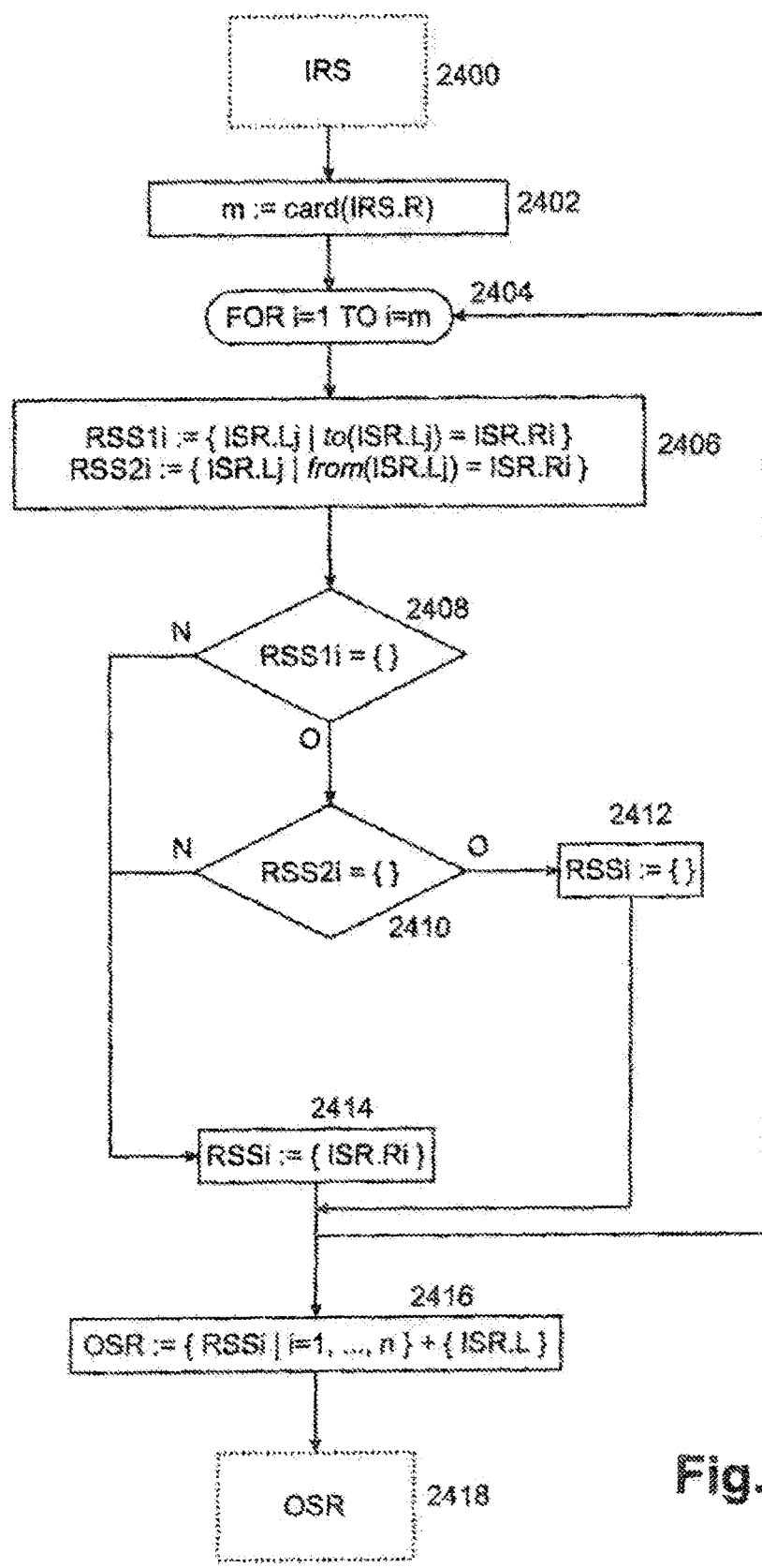
FIGS. 24 to 27 are flowcharts respectively illustrating functions of yet another tool of the device in FIG. 17.

FIG. 24 illustrates a first function of the RLNK tool 1708.

At step 2400, the RLNK function receives a set of resources IRS.

The set of resources IRS received at step 2400 may result from the call of one of the functions of the ATTRSEL tool 1706, in particular the third function of this tool.

At step 2402, the number m of resources is determined, excluding the links, contained in the IRS set.

At step 2404, a loop is initiated on the dummy variable "i" which varies from 1 to m.

For a particular resource Ri, a first subset of result-resources RSSi1 is determined comprising the links Lj of the IRS set, such that the call of the function to, as defined in Annex A.3.17, for this link Lj is equal to the resource Ri.

Still during this step 2406, and for the resource Ri under consideration, a second subset of result-resources RSS2i is determined comprising the links Lj of the IRS set, such that the result of the call of the from function, as defined in Annex A.3.18, for this link Lj, is the resource Ri.

At step 2408, a test is performed to determine whether or not the RSS1i set is empty.

If so, it is moved onto step 2410 to determine whether or not the set RSS2i is empty.

If so, it is moved onto step 2412 in which a subset of result-resources RSSi is defined for the resource Ri, which is equivalent to the empty set. And steps 2406 et seq are recommenced for the following resource Ri of the IRS set.

If the test of step 2408 is negative, as in the case in which the test of step 2410 is negative, it is moved onto step 2414 during which the RSSi set for the resource Ri is defined and comprises the resource Ri of the IRS set concerned. Then steps 2406 et seq are recommenced for the following resource Ri of the IRS set.

At the end of this loop, at step 2416, the set of result-resources OSR is defined which comprises each of the subsets RSSi and all the links of the IRS set, denoted IRS.L.

Finally, at step 2418, the OSR object is delivered as result.

Figure 25:
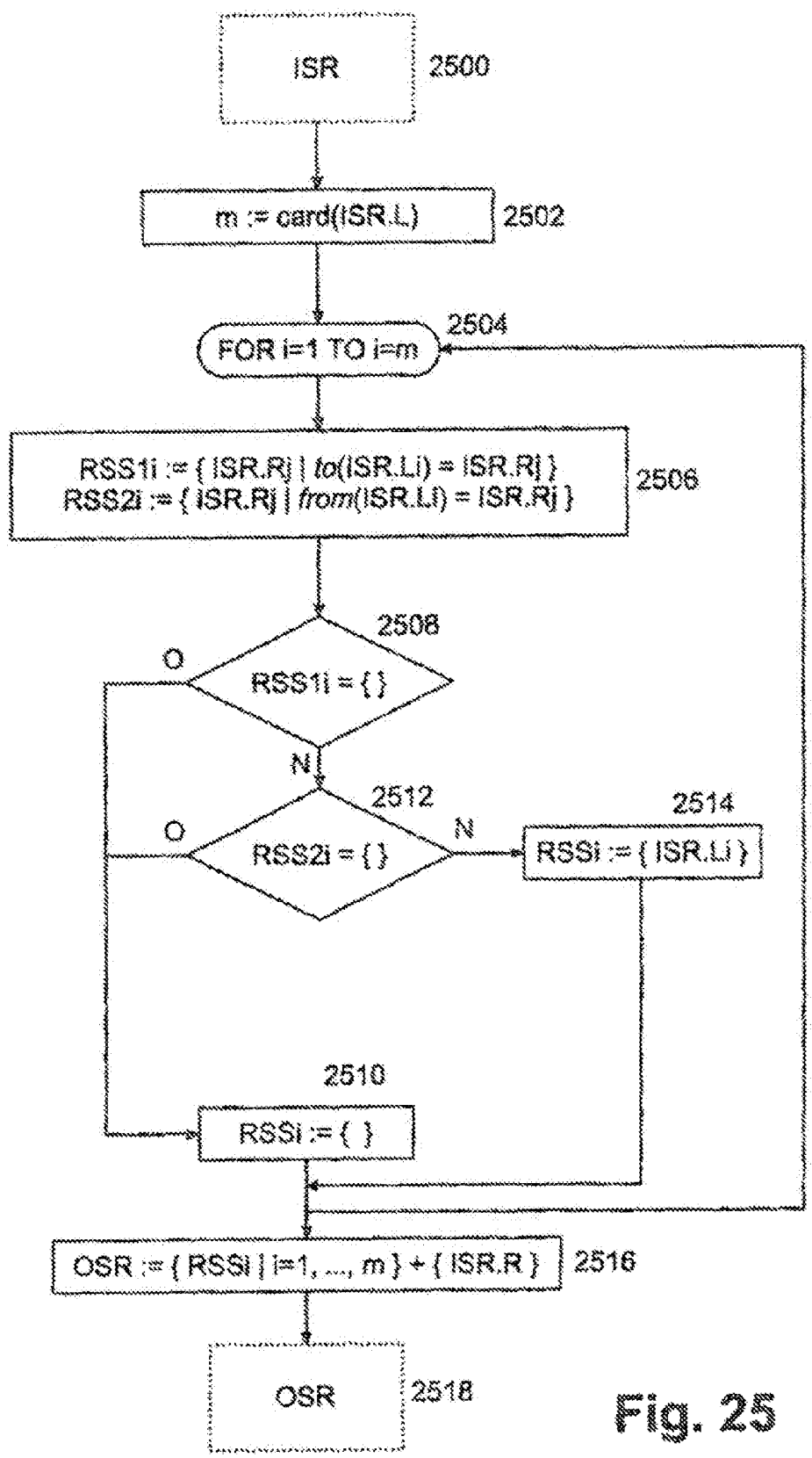

FIG. 25 illustrates a second function of the RLNK tool 1708.

At step 2500, this second function receives an input set of resources ISR.

At step 2502, the number denoted m of links included in the ISR set is determined.

At step 2504, a loop is initiated on the dummy variable "i" which is incremented in units from 1 to m.

For a particular link, denoted Li, of the ISR set the following are determined at step 2506:

a first subset of resources, denoted RSS1i, for the link Li comprising the resources Rj, excluding the links, of the ISR set, such that the result of the call of the to function for the link Li under consideration corresponds to this resource Rj, and a second subset of resources, denoted RSS2i, for this link Li, comprising the resources Rj, excluding the links, of the ISR set corresponds to the result of the call of the from function on the link Li.

At step 2508, it is verified whether or not the subset RSS1i is empty.

If so, it is moved onto step 2510 in which a subset of result-resources, denoted RSSi, is created for the link. The subset RSSi is created as being empty.

If not, at step 2512 it is verified whether or not the subset RSS2i is empty.

If so, it is moved onto step 2510. If not, it is moved onto step 2514 in which a subset RSSi is created which is created as comprising the link Li under consideration.

The steps 2506 et seq are then recommenced for the following link Li of the ISR set.

At the end of the loop initiated at step 2504, a set of result-resources OSR is defined. The OSR set comprises the subset RSSi corresponding to each of the links Li of the ISR set, and all the resources, excluding the links, of this ISR set, globally denoted ISR.R.

Finally, at step 2518, the OSR set is returned as result.

Figure 26:
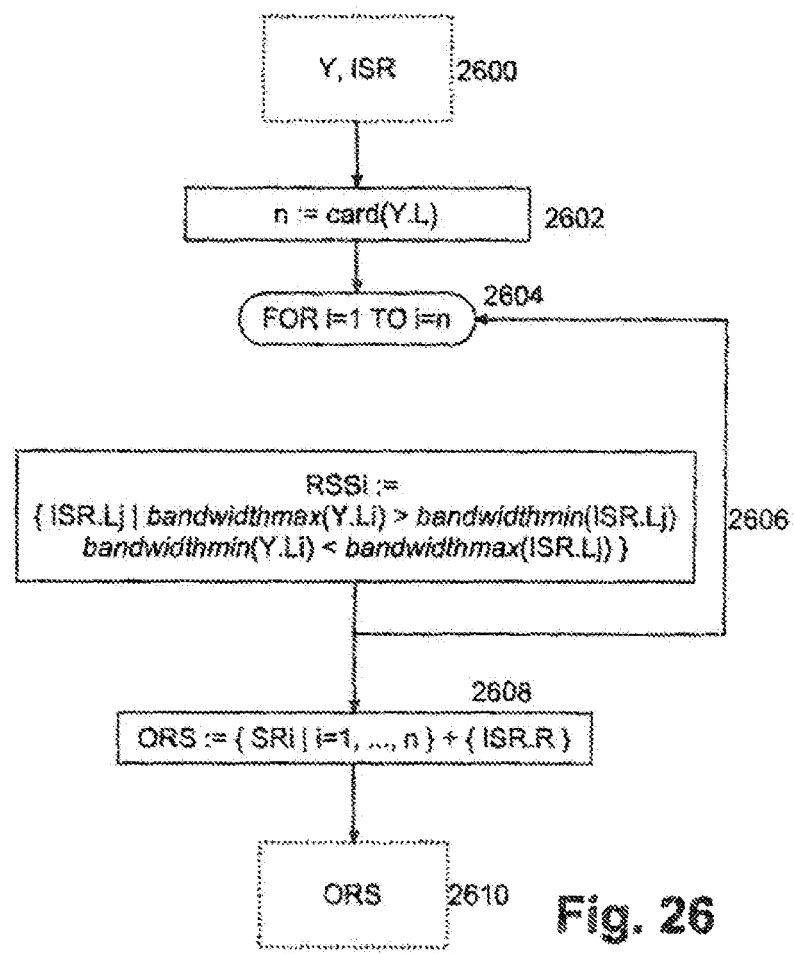

FIG. 26 illustrates a third function of the RLNK tool 1708.

At step 2600, the function under consideration receives the request Y and a set of input resources ISR.

At step 2602 the number of links, denoted n, concerned by the request Y is determined.

A step 2604, a loop is initiated on the dummy variable "i" which will be incremented from 1 to n.

For each link generically designated Li of the request Y, a subset of result-resources is determined, denoted RSSi, comprising the links Lj of the IRS set such that:

the result of the call of the bandwidthmax function, such as defined in Annex A.3.18, for the link Li of the request Y is greater than the result of the call of the bandwidthmin function, as defined in Annex A.3.19, on the link Lj under consideration, and such that:

the result of the call of the bandwidthmin function on the link Li of the request Y is smaller than the result of the call of the bandwidthmax function on the link Lj under consideration.

This is performed during step 2606.

Step 2606 is then recommenced for the following link Li of the request.

At step 2608, a set of result-resources OSR is defined comprising the subset RSSi corresponding to each of the links Li of the request Y, and all the resources, denoted ISR.R, excluding links, of the ISR set.

Finally, at step 2610 the ORS set returned as result.

FIG. 27 illustrates the functioning of the SCHDLR tool 1710.

At step 2700, the request Y and a subset of virtual resources ISR are received. Preferably, this subset ISR results from the successive call of the RNLK and ATTRSEL functions, so that the subset ISR only comprises nodes and links likely to respond to the request Y, optionally in combination with each other.

At step 2702, the capacitive profile of each of the resources of the ISR subset is considered. This generally entails polling the base VRDB 502.

At step 2704, it is determined whether or not there exists a solution in the ISR subset to the request Y which is compatible with the respective capacitive profiles of the resources. In other words, for each of the resources of the ISR subset, it is determined whether its capacitive profile allows suitable reservation in terms of date/duration and capacity. Finally, a subset of solutions is determined for the request Y.

If the set of solutions is empty, then at step 2706 an empty capacitive profile is returned.

At step 2708, which follows on after step 2704, it is determined whether there are one or more solutions to the request Y.

If there is only one solution, an updated set of capacitive profiles is returned at step 2710 i.e. containing the necessary reservations in capacity and in time. And the adequate VPXI object is created in the table of VPXIs.

If there are several solutions, an optimization procedure is launched to determine which of the solutions of the set at step 2704 best meets predetermined criteria. These criteria essentially concern the management of the infrastructures as a whole.

In the example of embodiment illustrated in FIG. 27, the SCHDLR module 1710 uses a scheduling algorithm request by request. This SCHDLR module 1710 may also be arranged so as to process several requests together of request Y type. In other words, the SCHDLR module 1710 is able to operate in batches.

The optimization step 2712 is intended to define the best time period to carry out all the capacity reservations of the resources involved in the request(s) Y. This is similar to a scheduling issue.

For this optimization, it is possible to have recourse to a linear programme adapted for optimizing a so-called "objective" function predefined by the manager of the infrastructure virtualization system, here the VIM manager 500. An "objective" function can therefore consist of maximizing the number of accepted Y requests. Depending on the statistical distribution of requests, said maximization could be obtained by allocating the minimum capacity to each request over the longest period of time, at least for those requests specifying an integral capacity.

The optimization step 2712 can have recourse to a more complex scheduler, adapted for example to optimize several criteria simultaneously, such as user satisfaction, use of resources, energy consumption, financial cost for the client and the like.

It is then returned to step 2710.

The invention is not limited to any particular scheduling algorithm. In practice, any scheduler capable of defining resource reservation profiles from a set of resources can be used herein.

Examples of applicable algorithms are proposed in the above-referenced articles. These algorithms were generally optimized for reserving bandwidth or for scheduling data transfer requests. These algorithms were notably implanted in the "open source" software jBDTS filed with the Agency for the Protection of Programmes, APP, under number IDDN.FR.001.220025.000.S.P.2008.000.10700, and VXscheduler filed with the APP under number IDDN.FR.001.290010.000.S.P.2009.000.10800.

The optimal functioning of the system requires that the different constituent elements of the virtual infrastructure 500 should be synchronized together.

At the very least, this means that the VIM manager 500, each of the managers PI-i200-i and each device itself executing series Se must be synchronized together. This can be obtained by means of a synchronizing device, linking the modules in charge of interpreting time profiles, synchronizing the execution of time series and controllers operating changes within the items of equipment of the infrastructure. This device may comprise one or more global clocks of GPS type, an NTP server, NTP clients, a global distributed clock in the form of software for example, which is built and resynchronized from any physical time source.

A tool has just been described for the assisted operating of a network of interconnected items of physical equipment, each having transmission, storage and/or digital data processing capabilities.

This tool particularly comprises a resource manager associated with a data storage describing the capacities of the different items of equipment in the network, or status data on the resources. This storage is arranged in a data structure in which an identifier is related with dated values of quantitative magnitudes.

The resource manager registers at least some of the items of equipment of the network as resource in the status data storage having as identifier an equipment identifier and as dated value of quantitative magnitudes a first sequence of dated values of transmission, storage and/or processing capacities defining a global utilizable capacity of the resource, and one or more sequences of dated values of transmission, storage and/or processing capacities defining temporarily allocated resource capacities. These sequences of values assume the form of what has been called time capacity profiles, which may relate to reserved, maximum, allocatable capacities etc.

A resource selector has also been described which can be used for example in this tool for the assisted operation of a network, comprising a first selection tool adapted to return a subset of resource identifiers selected from the data storage as per functional identification data, a second selection tool adapted to return a subset of resource identifiers selected from a data storage as per geographic location data drawn from the reservation request, a third selection tool adapted to return a subset of resource identifiers selected from the data storage as per non-functional attribute data drawn from this request, a fourth selection tool adapted to receive a subset of resource identifiers and to return firstly only those received identifiers which are held in a link data storage as second or third resource identifier in relation to a first resource identifier, and secondly each of the first identifiers under consideration.

This is a particularly advantageous configuration of the resource selector comprising a set of selection functions operating on criteria differing from each other. The resource selector may only comprise some of these selection functions.

A planning tool has also been described adapted to evaluate an acceptance condition on the basis of expressions of date comparison which relate to a dated functional capacity and to dated sequences of transmission, storage and/or processing capacity held in relation to one or more resource identifiers. This planning tool is therefore capable of verifying whether a resource can be reserved, in other words whether its capacity profile permits reservation and under which conditions.

A resource allocator has also been described arranged to receive an identified request for temporary reservation of functional capacity comprising a dated set of functional data, and to respond to the request by calling the resource selector for each functional data item of the request, by calling the planning tool for at least some of the identifiers of the subset returned by the resource selector, and finally by returning a set of resource identifiers as response to the reservation request.

A virtual infrastructure manager has also been described which is associated with a second storage of status data and virtual infrastructures. This second data storage is arranged in a second data structure in which an identifier is related with dated values of quantitative magnitudes.

The virtual infrastructure manager is adapted to register virtual units in the second data storage with, as identifier, an identifier of the unit, and as dated value of quantitative magnitude a second sequence of dated values of processing, storage and/or transmission capacities of the virtual unit defining a global utilizable capacity of the unit in the form of a capacity profile. This virtual infrastructure manager is also associated with a third data structure in which a virtual unit identifier is associated with a group of resource identifiers and hence with the corresponding sequences of dated capacity values.

The first, second and third data structures therefore jointly define a virtual infrastructure object corresponding to a virtual unit identifier for at least some of these identifiers whilst maintaining correlation between the first and second sequences of dated values of processing, storage and/or transmission capacities i.e. in particular between the capacity profiles of the elements of the virtual infrastructure, those of the infrastructure itself and especially those of the network equipment i.e. physical resources.

A network manager is in charge of holding rights and capacities for users as a function of time.

The virtual infrastructure manager is arranged to reconfigure virtual infrastructure objects dynamically as a function of the requested rights and capacities, further to a request for re-provisioning or reservation for example.

Any reconfiguration operation of a virtual infrastructure comprises a reconfiguring operation of the content of the third data structure associated with the virtual infrastructure object and/or a reconfiguration of the content of the first data structure concerned by the virtual infrastructure object. This makes it possible to manage the virtual infrastructure in relation to a plurality of time graphs of processing and/or transmission capacity of the physical equipment contained in the operated network.

An equipment controller has also been described capable of causing a physical item of equipment to operate in conformity with a set of functioning parameters and a data storage arranged in a structure which relates an identifier of this physical equipment firstly with a set of dated attribute values and secondly with a list of command functions capable of modifying at least some of the controller's functioning parameters.

An interpreter is adapted to receive at the same time an equipment identifier and a time horizon parameter, and to respond thereto by defining a sequence of respective events from information drawn from the data storage concerned by the time horizon, which we have called a time series of events, each event interrelating a date, one or more identifiers of command functions and a set of parameters for these functions, determined on the basis of a dated attribute value.

The controller, the interpreter and the sequencer function jointly to carry out an "infinite" process, at least on the scale of the system's lifetime, this process being executed in the background at least for the parts of these elements executed on the resources.

Each physical infrastructure manager in combination with one or more actuators arranged on the equipment itself or remotely, optionally partially, acts as a sequencer which calls the interpreter and chronologically calls the functions of each event of the sequence such as returned by the interpreter. This makes it possible to pilot, command, control, automate, programme and/or sequence the equipment remotely. The calling of the interpreter can nevertheless take place in programmed manner, at predefined time intervals or systematically as soon as a change occurs in the time profile of a physical equipment item.

The tool for assisted operation may contain any combination of the functional elements described above when these elements are compatible.

The proposed tool uses a logic representation of the physical functional capacity of any technical device forming a network, in particular a wide area network such as the Internet. Each technical device is considered to be a "resource" of the network. And this resource can be virtualized i.e. it can host several resources generally having an identical main function giving any user the impression that the virtual resource being used is an own physical resource.

A model has been proposed for the logical and dynamic segmenting of the individual, physical functional capacity of each of these resources. Sliding, limited time series have also been proposed for management, configuration and control events of the physical resource, for all types of resources. These time profiles and event series assist in the management of resources, in particular by facilitating the computing generated by resource allocation operations subsequent to a user request.

It becomes possible to allocate or dedicate a logical fraction of the network to an infrastructure of "best effort" type in the current Internet. This infrastructure can be offered to public access without a performance guarantee.

The proposed tool enables any owner of computing equipment having processing, communication or storage capacities to insert this equipment dynamically, flexibly and reversibly in a vast global reservoir of resources as formed by the Internet, to segment the functional capacities of this resource dynamically and to choose which uses are to be given to isolated functional sub-capacities.

Any operator of a resource or collection of resources such as a network, cluster of computers or data centre is able remotely to manage and configure its resources dynamically and flexibly or to transmit threshold values thereto allowing self-management and configuration. It allows strict monitoring, simple accounting and precise statistical analyses of uses of the resources as per two magnitudes namely time and capacity, and more generally time and any attribute which may be associated with a physical equipment item. This allows the efficient determining of cost calculations and sizing of individual capacities.

The proposed tool also allows equitable return on infrastructure investments by giving added value to the container assembly as a whole such as storage spaces or delivery capacities, and no longer only to the processing and delivery of the content as is the case in the current Internet.

This tool may allow progressive transformation of the current Internet towards an Internet of the future offering a service of universal connectivity, more service capacity and infrastructure services on request, high level capacities with guaranteed quality. The tool uses a model of time representation of network capacities which can be qualified as "fine grain". This offers dynamic control, management and maximized return on resources of the network in general and of the Internet in particular, which allows the ensured global adjustment of these resources to environmental conditions and actual needs.

The proposed tool is adapted to any equipment using any network abstraction layer (1, 2 and 3) of the current Internet and modern virtualization mechanisms of computing resources. It is possible to re-use all existing protocols and software, but also to use new network, transport and application protocols which may prove to be more efficient and better adapted to new applications.

Any manufacturer of computing or communication components is able to give a logical representation of the capacity of the equipment it manufactures and thereby allow the remote, dynamic and flexible management and configuration thereof, by means of standard protocols such as Netconf or even independently.

The tool therefore provides for advantageous use of dynamic configuration mechanisms and control plans developed over recent years in optical networks and packet networks such as GMPLS/ASON, MEF, MTOSI in particular.

Above all, the tool allows the sharing of resources between different users having differing constraints and interests. Some users need real-time or in-advance guarantees, whilst others are incapable of predicting such needs or have no use thereof. This all takes place by offering the operator or owner of the physical resource the possibility to draw best benefit from the resources of their infrastructure.

The proposed tool is based on continuous time representation (universal time) which sets it well apart from other propositions in the field in which time is handled in slots.

It is not compulsory for the tool to use discrete capacity values. This makes it possible to obtain solutions that can be calculated in polynomial time, which proves to be most advantageous in particular when computing the allocation of resources subsequent to user requests.

The tool also allows the logical, dynamic dividing of a distributed physical computing infrastructure into sub-infrastructures controlled independently of each other and potentially isolated. It diversifies and thereby increases the optimization of distributed infrastructures by offering a solution of quality, service and security for users ready to pay the price.

According to another aspect, the proposed tool allows a decision to be made on the place and time frame for embedding a virtual private computing infrastructure in a public physical infrastructure that is geographically distributed. It allows acceleration of the decision process for the allocation of resources by carrying out successive restrictions of the solution space.

The invention is not limited to the embodiments described above solely as examples, but encompasses all variants which may be envisaged by persons skilled in the art. In particular, a system has been described having optimal functioning. In practice, for this system to function at minimum level, it is sufficient that the VIM manager 500 and each manager PIM 200-I keeps a VPXI object for each virtual sub-infrastructure, an object of VXNOD type for each virtual node and a "Substrate node" object for each physical equipment item in the network. The system then functions in fail-soft mode with no management of its network.

So that the system nevertheless functions in managed network mode, a VXlink object must also be held for each virtual link between virtual nodes, and a "Substrate link" object for each physical link of the network.

It has been described that a physical resource, node or link, could be used as base for one or more virtual resources depending on the type of physical equipment under consideration. It is to be appreciated that several physical resources could also be grouped together to form only one virtual node, and in the same manner several virtual nodes could be grouped together to form one and the same virtual node, managed singly.

The managers VIM500 and PIM200-I have been described with respect to their functional properties within the system. It will be appreciated that any implementation of these functions, regardless of form, comes within the scope of the present application. These managers may be centralized or distributed, fully or in part, in particular in accordance with the configurations and possibilities of the equipment available within the infrastructures.

The proposed tool allows the unified, generalized and combined management of all the resources of the network. All these resources, irrespective of type, a computer, router and/or links interconnecting these resources, at all control and management levels are processed homogeneously. Finally, the physical elements are disregarded to remove any boundaries between them.

The present invention also concerns the software code it may use, in particular when it is made available on any computer-readable medium. The expression "computer-readable medium" covers a storage medium e.g. magnetic or optical as well as a transmission means such as a digital or analogue signal transiting via a material link or over waves.

The tool for the assisted management of physical communicating equipment according to the invention, by means of the equipment controller, allows the programming and/or direct commanding of the functioning of the physical equipment and/or the reconfiguration thereof particularly in relation to time-defined events defined by the interpreter. The physical equipment is therefore piloted as a function of time; its control and/or configuration parameters are programmed as a function of time.

Depending on embodiments, the tool for aiding the management of physical equipment is partly or fully mutualized for several items of equipment, or on the contrary is dedicated to one item of equipment. Its constituent elements, depending on embodiments, are integrated in full or in part in the equipment or on the contrary are separate from the equipment.

In one embodiment, a time profile is therefore determined for each item of equipment.

Additionally, the physical (physical equipment items) and/or virtual resources (i.e. part of the physical equipment time-shared and/or capacity-shared) are coordinated together via a centralized coordinator and/or via coordination between the tools for the assisted management of physical equipment and/or via coordination between the resources directly. Interactions may therefore take place between the items of equipment, influencing the programming of their functioning or their functioning directly.

For example, in one embodiment, when a storage resource is associated with a transmission resource for a planned operation during a determined period and the corresponding events are defined by the interpreters, if the storage resource and/or the controller of its tool for assisted management, further to interactions between the storage resource and the transmission resource, detects an increase in the rate of transmission for the transmission source compared with initial programming, either during the operation itself or beforehand, the storage resource and/or its tool for assisted management triggers corresponding programming of the storage resource.

In one embodiment, the resource operated by the equipment controller of the associated tool for assisted management is also capable of adapting and of modifying its function in relation to the piloting by the equipment controller further to an interaction with another resource and/or the onset of a local set-point value of the resource (e.g. overstepping a load threshold, error threshold etc.).

This interaction with another resource may correspond for example to commanded reconfiguration to increase the size of the storage space, by a resource of "link" type which detects an increase in the number of packet losses at its output end at which the storage space is located.

The local set-point value may entail, for example, the doubling of the capacity of the link if its rate of use exceeds 80%, or a reduction in the memory space of the virtual server by 30% if its rate of use drops to less than 10% etc. The set values and the thresholds may be relative or absolute.

| Annex 1—Data structures | | |
|---|---|---|
| A.1.1—Types of objects | | |
| A.1.1.1 Structure | F $F = \{d, h\}$ with: | type: time window |
| | d: start date of the window, in universal time | |
| | h: horizon of the time window, expressed in milliseconds | |
| A.1.1.2 Structure | R $R = \{URI, CBID, type\_r, class\_c, unit\_o, param\_e, tmin, cgranul, nb\_grainmax, nb\_profilmax, nb\_evt\_max\}$, where: | type: data handling resource |
| | URI: universal name | |
| | CBID: single crypto-based identifier | |
| | type_r: type of resource, see set Rt | |
| | class_c: class of main capacity, see set Ct | |
| | unit_c: capacity unit, see object Uc | |
| | param_e: list of prototypes of capacity functions triggered on capacity event | |
| | tmin: minimum time between two capacity events of the resource | |
| | cgranul: minimum granularity of a capacity fragment | |

| Annex 1—Data structures (continued) | | |
|---|---|---|
| | expressed in capacity unit unit_c | |
| | nb_grainmax: max number of grains managed for the resource | |
| | nb_profilmax: max number of profiles managed for the resource | |
| | nb_evt_max: max number of events managed per time window | |
| How | Data handling comprises the transmission and processing of this data | |
| A.1.1.3 structure | Ek $Ek (r) = \{tk, type\_Ek, ck (r), actions\_Ek (r)\}$ where: | type: capacity event for a resource r, whose capacity is measured in unit_c |
| | tk: date expressed in universal time and included in the window F | |
| | type_Ek: type of event among (cap_provisioning, cap_renting) | |
| | ck: capacity expressed in units unit_c of the resource R | |
| | action_Ek (r): list of actions and parameters associated with the event Ek (r) activated on the date tk in relation to type of event | |
| How | For the resource R, the date tk is used as index for the search and occurrence of events | |
| A.1.1.4 structure | Se $Se (r, F) = \{ek (r), k \text{ integer in } 0, n-1\}$ | type: series of capacity events for a resource r |
| | where ek is a capacity event and has value in F, | |
| | where n is limited by nb_evt_max (r) | |
| | where $tk + j - tk \geq tmin (r)$ | |
| How | tmin (r): there is a minimum time, specific to each resource, to be heeded between two capacity events | |
| A.1.1.5 structure | Ne $Ne = cardinal (Se (r))$ | type: number of events of a series of capacity events |
| A.1.1.6 structure | profile (t, r, F) $profile (t, r, F) = c0 + c1\, he1(t) + c2\, he2(t) + c3\, he3(t) + \ldots + cn-1\, hen-1(t)$ | type: capacity profile |
| | where ci is expressed in capacity units of the resource r | |
| | where $ci = m \times cgranul (r)$ with m an integer | |
| | where n is limited | |
| | where $he1 = 1$ if t in $[ti, ti + 1[$, 0 otherwise | |
| | where t is in F | |
| A.1.1.7 structure | PHI (r, F) $PHI (r, Se) = \Sigma ci (ti + 1)$ | type: capacity fragment |
| | where ci and ti are associated with the event ei of Se (r, F) | |
| | where i is an integer with value in [0, Ne-1]. | |
| A.1.1.8 Structure | R_PROFILE (t, r, F) $R\_PROFILE (t, r\, F) = \{Cmax (t, r, F), Cbe (t, r\, F), Cexpo (t, r, F)\}$ | type: general resource profile |
| | where Cmax (t, r, F) is the profile encompassing the capacity of the resource r, for the time window F. | |
| | where Cbe (t, r, F) is the profile of the aggregated best effort capacity of the resource r, allocated to a service corresponding to traditional Internet for the time window F. | |
| | Cexpo (t, r, F) is the name given to the exposed profile of the residual capacity of the resource r, non-allocated to traditional Internet, not kept in reserve and exposed to reservation, for the time window F. | |
| A.1.1.9 structure | RESA_PROFIL (r, F $RESA\_PROFIL (t, r, F) = \{Cj (t, r, F), j \text{ integer in } \{0, m-1\}\}$ where m is limited by nb_profilmax | type: reserved resource profile (t, r, F) |

| A.1.2—Properties | |
|---|---|
| A.1.2.1 | fragmentability of a capacity c of resource r of profile R_PROFILE |
| | If it is possible to define a capacity profile (or inaccurate term sub-capacity) such that: profil (t, r, F) < Cmax (t, r, F) for at least one time window F. |
| | The relationship < profiles being defined by profil (t, r, F) < profil2 (t, r, F) for every t in F |
| | One necessary condition is that $nb\_profilmax > 1$, $nb\_grainmax > 1$ and $cgranul < Cmax (t, r, -)$ for at least one interval $[tk, tk + 1]$ of the life of the resource |
| A.1.2.2 | isolation of a capacity fragment PHI (r, F). |
| | If, for every interval [ti, ti + I] of the time window F, the capacity values cei effectively accessible during this interval |

-continued

| Annex 1—Data structures | | |
|---|---|---|
| | are such that: | |
| | cei (t) = ci (t) ou cei (ti + 1-ti) = ci (ti + 1-ti) | |
| | The reserved capacity and effectively accessible is independent of the effective load of the system at time t. (There is no overbooking or congestion ascertained during use). | |
| A.1.3—Open ended sets | | |
| A.1.3.1 | Rt | Types of data processing resource |
| Example | Rt = {computing element, storage element, display element, detection element, transit element, transmission element . . . } | |
| A.1.3.2 | F | Types of elementary data handling function |
| Example | F = (transforming, storing, outputting, inputting, routing, transferring . . . ) | |
| A.1.3.3 | Cp | Classes of physical capacities |
| Example | Cp = (processing capacity, disk space, bandwidth, set of lambdas, set of processing core, . . . ) | |
| How | Can be divided into a number, not necessarily limited and finite, of fragments of variable capacity | |
| | Is associated with a measurable unit of capacity of real, rational or integer type and which is not a logical label | |
| | A physical capacity is isolated performance-wise | |
| A.1.3.4 | Cl | Classes of logical capacities |
| Example | Cl = {set of virtual machines, set of virtual links, sets of virtual screens, . . . } | |
| How | Can be segmented into a finite and limited number of logical units. | |
| | Is associated with a capacity unit U_c integer or Boolean, called << logical label >>. | |
| | A unit of logical capacity is not isolated performance-wise | |
| A.1.3.5 | C | Data handling capacity |
| Example | C = Cp U Cl | |
| How | Data handling comprises the transmission and processing of data. | |
| A.1.3.6 | U_c | Capacity units |
| Example | U_c = {Hertz, Bit/second, Byte, frame/second, logical label . . . } | |

| Annex 2—Functions | |
|---|---|
| A.2.1 | location ( ) |
| Description | Returns a location attribute of a physical or virtual resource |
| A.2.2 | latencymax ( ) |
| Description | Returns a maximum latency value of a physical or virtual resource |
| A.2.3 | latencymin ( ) |
| Description | Returns a minimum latency value of a physical or virtual resource |
| A.2.4 | bandwidthmax ( ) |
| Description | Returns a maximum bandwidth value of a physical or virtual resource |
| A.2.5 | bandwidthmin ( ) |
| Description | Returns a minimum bandwidth value of a physical or virtual resource |
| A.2.6 | function ( ) |
| Description | Returns a list of identified functionalities associated with a component (individual or of a group) |
| A.2.7 | start ( ) |
| Description | Returns a start date value of availability of a component |
| A.2.8 | end ( ) |
| Description | Returns an end date value of availability of a component |
| A.2.9 | cpumax |
| Description | Returns a maximum processor capacity value for a physical or virtual component |
| A.2.10 | cpumin ( ) |
| Description | Returns a minimum processor capacity value for a physical or virtual component |
| A.2.11 | rammax ( ) |
| Description | Returns a maximum RAM capacity value for a physical or virtual component |
| A.2.12 | rammin ( ) |
| Description | Returns a minimum RAM capacity value for a physical or virtual component |
| A.2.13 | hdmax ( ) |
| Description | Returns a maximum storage capacity value on hard disk for a physical or virtual component |
| A.2.14 | hdmin ( ) |
| Description | Returns a minimum storage capacity value on hard disk for a physical or virtual component |
| A.2.15 | sizemax ( ) |
| Description | Returns a maximum size value in number of resources for a physical or virtual component |
| A.2.16 | sizemin ( ) |
| Description | Returns a minimum size value in number of resources for a physical or virtual component |
| A.2.17 | vmnode ( ) |
| Description | Returns a maximum number of virtual machines which can be allocated on a physical resource |
| A.2.18 | allocated ( ) |
| Description | Returns a number of virtual machines allocated on a physical resource |

What is claimed is:

1. A method for operating a network of interconnected items of physical equipment the method comprising:
registering, by an infrastructure management apparatus, each of a network of interconnected items of physical equipment as a resource in a first data structure, with an equipment identifier and a first sequence of dated values of at least one of a processing, storage, or transmission capacity of the equipment defining a global, utilizable capacity of the resource;
registering, by the infrastructure management apparatus, a plurality of virtual units in a second data structure, with an identifier of the unit and a second sequence of dated values of a processing, storage, or transmission capacity of the virtual unit defining a global utilizable capacity of the unit, the registering further comprising generating a third data structure in which a virtual unit identifier is associated with a group of resource identifiers and the corresponding sequences of dated capacity values, the first, second and third data structures thereby defining a virtual infrastructure object corresponding to a virtual unit identifier and a correlation between the first and second sequences of dated values of the at least one of the processing, storage or transmission capacity; and
maintaining, by the infrastructure management apparatus, requested rights and capacities for users as a function of time in response to a received re-provisioning or reservation request; and
dynamically reconfiguring, by the infrastructure management apparatus, the virtual infrastructure object in relation to the requested rights and capacities, comprising at least one of reconfiguring the content of the third data structure or reconfiguring the content of the first data structure.

2. The method as recited in claim 1, further comprising determining, by the infrastructure management apparatus, when one of the requested capacities exceeds the global utilizable capacity of one of the virtual units, and only reconfiguring the virtual infrastructure object when the one of the requested capacities is determined to exceed the global utilizable capacity of the one of the virtual units.

3. The method as recited in claim 1, further comprising maintaining, by the infrastructure management apparatus, for one or more of the virtual units, an instance of a virtual infrastructure object for every time period corresponding to at least one of a nonzero processing, storage, or transmission capacity of the one or more virtual units.

4. The method as recited in claim 1 wherein the first or second data structure further comprises a list of non-functional attributes related to the resource or unit identifier, the said list comprising one or more attributes relating to security, performance, geographical location, financial cost, energy cost, ownership, reliability, or performance monitoring.

5. The method as recited in claim 1 wherein the registering each of the network of interconnected items of physical equipment is performed by a physical infrastructure management computing device of the infrastructure management apparatus, the registering the plurality of virtual units is performed by a virtual infrastructure management computing device of the infrastructure management apparatus, and the physical infrastructure management computing device, the virtual infrastructure management computing device, and at least some of the items of physical equipment of the network are mutually synchronized.

6. The method as recited in claim 1 wherein each item of physical equipment comprises a plurality of nodes of the network and network links linking these nodes together, and each item of physical equipment has at least one of a transmission, storage and digital data processing capacity.

7. An infrastructure management apparatus, comprising memory comprising programmed instructions stored in the memory and one or more processors configured to be capable of executing the programmed instructions stored in the memory to:
  register each of a network of interconnected items of physical equipment as a resource in a first data structure, with an equipment identifier and a first sequence of dated values of at least one of a processing, storage, or transmission capacity of the equipment defining a global, utilizable capacity of the resource;
  register a plurality of virtual units in a second data structure, with an identifier of the unit and a second sequence of dated values of a processing, storage, or transmission capacity of the virtual unit defining a global utilizable capacity of the unit;
  generate a third data structure in which a virtual unit identifier is associated with a group of resource identifiers and the corresponding sequences of dated capacity values, the first, second and third data structures thereby defining a virtual infrastructure object corresponding to a virtual unit identifier and a correlation between the first and second sequences of dated values of the at least one of the processing, storage or transmission capacity; and
  maintain requested rights and capacities for users as a function of time in response to a received re-provisioning or reservation request; and
  dynamically reconfigure the virtual infrastructure object in relation to the requested rights and capacities, comprising at least one of reconfiguring the content of the third data structure or reconfiguring the content of the first data structure.

8. The infrastructure management apparatus as recited in claim 7, wherein the one or more processors are further configured to be capable of executing the programmed instructions stored in the memory to determine when one of the requested capacities exceeds the global utilizable capacity of one of the virtual units, and only reconfiguring the virtual infrastructure object when the one of the requested capacities is determined to exceed the global utilizable capacity of the one of the virtual units.

9. The infrastructure management apparatus as recited in claim 7, wherein the one or more processors are further configured to be capable of executing the programmed instructions stored in the memory to maintain, for one or more of the virtual units, an instance of a virtual infrastructure object for every time period corresponding to at least one of a nonzero processing, storage, or transmission capacity of the one or more virtual units.

10. The infrastructure management apparatus as recited in claim 7, wherein the first or second data structure further comprises a list of non-functional attributes related to the resource or unit identifier, the said list comprising one or more attributes relating to security, performance, geographical location, financial cost, energy cost, ownership, reliability, or performance monitoring.

11. The infrastructure management apparatus as recited in claim 7, wherein the each of the network of interconnected items of physical equipment is registered by a physical infrastructure management computing device of the infrastructure management apparatus, the plurality of virtual units is registered by a virtual infrastructure management computing device of the infrastructure management apparatus, and the physical infrastructure management computing device, the virtual infrastructure management computing device, and at least some of the items of physical equipment of the network are mutually synchronized.

12. The infrastructure management apparatus as recited in claim 7, wherein each item of physical equipment comprises a plurality of nodes of the network and network links linking these nodes together, and each item of physical equipment has at least one of a transmission, storage and digital data processing capacity.

13. A non-transitory computer readable medium having stored thereon instructions for operating a network of interconnected items of physical equipment, comprising executable code which when executed by a processor, causes the processor to perform steps comprising:
  registering each of a network of interconnected items of physical equipment as a resource in a first data structure, with an equipment identifier and a first sequence of dated values of at least one of a processing, storage, or transmission capacity of the equipment defining a global, utilizable capacity of the resource;
  registering a plurality of virtual units in a second data structure, with an identifier of the unit and a second sequence of dated values of a processing, storage, or transmission capacity of the virtual unit defining a global utilizable capacity of the unit;
  generating a third data structure in which a virtual unit identifier is associated with a group of resource identifiers and the corresponding sequences of dated capacity values, the first, second and third data structures thereby defining a virtual infrastructure object corresponding to a virtual unit identifier and a correlation between the first and second sequences of dated values of the at least one of the processing, storage or transmission capacity; an
  maintaining requested rights and capacities for users as a function of time in response to a received re-provisioning or reservation request; and
  dynamically reconfiguring the virtual infrastructure object in relation to the requested rights and capacities, comprising at least one of reconfiguring the content of the third data structure or reconfiguring the content of the first data structure.

14. The non-transitory computer readable medium of claim 13, wherein the executable code when executed by the processor, further causes the processor to perform at least one additional step comprising determining when one of the requested capacities exceeds the global utilizable capacity of one of the virtual units, and only reconfiguring the virtual infrastructure object when the one of the requested capacities is determined to exceed the global utilizable capacity of the one of the virtual units.

15. The non-transitory computer readable medium of claim 13, wherein the executable code when executed by the processor, further causes the processor to perform at least one additional step comprising maintaining, for one or more of the virtual units, an instance of a virtual infrastructure object for every time period corresponding to at least one of a nonzero processing, storage, or transmission capacity of the one or more virtual units.

16. The non-transitory computer readable medium of claim 13, wherein the first or second data structure further comprises a list of non-functional attributes related to the resource or unit identifier, the said list comprising one or more attributes relating to security, performance, geographical location, financial cost, energy cost, ownership, reliability, or performance monitoring.

17. The non-transitory computer readable medium of claim 13, wherein the registering each of the network of interconnected items of physical equipment is performed by a physical infrastructure management computing device, the registering the plurality of virtual units is performed by a virtual infrastructure management computing device, and the physical infrastructure management computing device, the virtual infrastructure management computing device, and at least some of the items of physical equipment of the network are mutually synchronized.

18. The non-transitory computer readable medium of claim 13, wherein each item of physical equipment comprises a plurality of nodes of the network and network links linking these nodes together, and each item of physical equipment has at least one of a transmission, storage and digital data processing capacity.

* * * * *